(12) United States Patent
Saha et al.

(10) Patent No.: US 12,073,428 B2
(45) Date of Patent: Aug. 27, 2024

(54) SYSTEM AND METHOD FOR AUTOMATICALLY RETRIEVING RELEVANT DIGITAL ADVERTISEMENTS FROM MULTIPLE CHANNELS

(71) Applicant: Walmart Apollo, LLC, Bentonville, AR (US)

(72) Inventors: Tanay Kumar Saha, San Jose, CA (US); Yanbing Xue, Sunnyvale, CA (US); Xiaobo Peng, Bellevue, WA (US); Jayanth Korlimarla, Sunnyvale, CA (US); Musen Wen, Mountain View, CA (US); Wei Shen, Pleasanton, CA (US); Rajesh Garigipati, San Bruno, CA (US); Anant Furia, San Jose, CA (US); Valeriy Pelyushenko, San Jose, CA (US); Chintan Jagdish Rita, Sunnyvale, CA (US); Ergin Guney, San Bruno, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/103,125

(22) Filed: Jan. 30, 2023

(65) Prior Publication Data
US 2024/0257175 A1    Aug. 1, 2024

(51) Int. Cl.
*G06Q 30/02*    (2023.01)
*G06Q 30/0242*    (2023.01)
(Continued)

(52) U.S. Cl.
CPC ..... *G06Q 30/0244* (2013.01); *G06Q 30/0275* (2013.01); *G06Q 30/0625* (2013.01); *G06Q 30/0631* (2013.01)

(58) Field of Classification Search
CPC ........... G06Q 30/0244; G06Q 30/0275; G06Q 30/0625; G06Q 30/0631; G06Q 30/0207–30/0277
See application file for complete search history.

(56) References Cited

U.S. PATENT DOCUMENTS 7,698,331 B2 *   4/2010   Carson, Jr. ............ G06F 16/951
                                                           707/728
8,078,617 B1 *   12/2011  Neveitt ................. G06F 16/335
                                                           707/732
(Continued)

FOREIGN PATENT DOCUMENTS

KR        100932318 B1 *   1/2005
WO        2022039749 A1      2/2022

OTHER PUBLICATIONS

Google Ads, "Ad Rank," https://support.google.com/google-ads/answer/1752122?hl=en, Downloaded from Internet Feb. 1, 2023, 3 pages.

(Continued)

*Primary Examiner* — Thuy N Nguyen
(74) *Attorney, Agent, or Firm* — Morgan, Lewis & Bockius LLP; Manita Rawat

(57) ABSTRACT

Systems and methods for automatically retrieving and providing digital advertisements from multiple channels with improved relevancy to a search query are disclosed. In some embodiments, based on a query, a first set of sponsored items is retrieved and ranked based on an optimization of conversion rate, and a second set of sponsored items is retrieved and ranked based on an optimization of click-through rate. Based on the first set of sponsored items and the second set of sponsored items, a ranked list of recommended items is generated for display based on an advertisement auction mechanism, in response to the query.

20 Claims, 12 Drawing Sheets

(51) Int. Cl.
*G06Q 30/0273* (2023.01)
*G06Q 30/0601* (2023.01)

(56) References Cited

U.S. PATENT DOCUMENTS

| | | | |
|---|---|---|---|
| 8,352,499 B2 | 1/2013 | Bharat et al. | |
| 8,671,093 B2* | 3/2014 | Chapelle | G06F 16/951 |
| | | | 707/723 |
| 9,367,606 B1* | 6/2016 | Lu | G06F 16/9535 |
| 9,817,902 B2* | 11/2017 | Rezaei | G06Q 10/02 |
| 10,296,956 B2* | 5/2019 | Shi | G06Q 30/0625 |
| 10,409,821 B2* | 9/2019 | Kulkarni | G06F 16/24578 |
| 10,642,905 B2* | 5/2020 | Gusev | G06N 20/00 |
| 11,562,292 B2* | 1/2023 | Safronov | G06F 16/3349 |
| 2004/0093327 A1* | 5/2004 | Anderson | G06F 16/9538 |
| 2007/0192300 A1 | 8/2007 | Reuther et al. | |
| 2008/0104061 A1* | 5/2008 | Rezaei | G06F 16/24575 |
| | | | 707/999.005 |
| 2009/0070310 A1 | 3/2009 | Srivastava et al. | |
| 2009/0265290 A1* | 10/2009 | Ciaramita | G06N 3/08 |
| | | | 706/12 |
| 2010/0076949 A1* | 3/2010 | Zoeter | G06F 16/334 |
| | | | 707/706 |
| 2010/0174710 A1* | 7/2010 | Carson, Jr. | G06Q 30/02 |
| | | | 707/E17.014 |
| 2010/0250335 A1 | 9/2010 | Cetin et al. | |
| 2011/0270672 A1* | 11/2011 | Hillard | G06Q 30/0246 |
| | | | 705/14.42 |
| 2013/0226690 A1* | 8/2013 | Gross | G06Q 30/0242 |
| | | | 705/14.41 |
| 2014/0122243 A1* | 5/2014 | Ramer | G06F 16/635 |
| | | | 705/14.64 |
| 2014/0180825 A1* | 6/2014 | Ramer | G06Q 30/0269 |
| | | | 705/14.64 |
| 2016/0019588 A1* | 1/2016 | Wagg | G06Q 30/0256 |
| | | | 705/14.54 |
| 2016/0078480 A1* | 3/2016 | Gross | G06Q 30/0277 |
| | | | 705/14.54 |
| 2016/0162574 A1* | 6/2016 | Gorodilov | G06F 16/319 |
| | | | 707/722 |
| 2016/0217180 A1* | 7/2016 | Rais-Ghasem | G06F 16/243 |
| 2018/0075150 A1* | 3/2018 | Rezaei | G06Q 10/02 |
| 2018/0095967 A1 | 4/2018 | Kota | |
| 2019/0087504 A1* | 3/2019 | Lu | G06F 16/9538 |
| 2019/0205474 A1* | 7/2019 | Pawar | G06F 40/205 |
| 2020/0210891 A1* | 7/2020 | Safronov | G06F 16/3349 |
| 2022/0350811 A1 | 11/2022 | Reuther et al. | |
| 2024/0112281 A1* | 4/2024 | Liang | G06Q 30/0201 |

OTHER PUBLICATIONS

Microsoft Bing Blogs, "Intelligent Product Search and Recommendations for Fashion Retail," https://blogs.bing.com/search-quality-insights/2019-01/Intelligent-Product-Search-and-Recommendations-for-Fashion-Retail, Jan. 3, 2019, 3 pages.

D. Charles et al., "Multi-Score Position Auctions," Proceedings of the Ninth ACM International Conference on Web Search and Data Mining, Feb. 22-25, 2016, 10 pages.

A. Maes, "Why Your Sponsored Product Ads are 'Ineligible'," Sep. 26, 2019, 12 pages.

\* cited by examiner

SYSTEM AND METHOD FOR AUTOMATICALLY RETRIEVING RELEVANT DIGITAL ADVERTISEMENTS FROM MULTIPLE CHANNELS

TECHNICAL FIELD

This application relates generally to digital advertising and, more particularly, to systems and methods for automatically retrieving and providing digital advertisements from multiple channels with improved relevancy to a search query.

BACKGROUND

An advertisement may be a presentation or communication to promote an item, such as a product or service, for purchase. At least some advertisements are digital advertisements, which include a digital representation of the presentation or communication, such as one displayed on a website. A sponsor of an advertisement, such as a business, may seek to sell the item in the advertisement. The sponsor may advertise the item in the advertisement to notify potential buyers of the sale of the item, thereby increasing the chances of selling the item. For example, the sponsor may advertise the item on a website, such as a retailer's website.

At least some sponsors pay a fee to have an item advertised. For example, a sponsor may pay a fee to a retailer to advertise the sponsor's item on the retailer's website, or through an advertising campaign. The amount of the fee may depend on a number of user interactions, such as user clicks or views, the item advertisement receives. But not all users are interested in the same item. For example, a user usually only clicks an advertised or sponsored item that matches the user's intent, interest, and/or a query submitted by the user. Because the pool for sponsored items has a limited size, in response to a query, an existing method may provide some sponsored items that have a low relevancy to the query. It is unlikely for customers to click and/or buy these low-relevant sponsored items, which will hurt the profit of the sponsors, the advertisers, as well as the website in the long run.

SUMMARY

The embodiments described herein are directed to systems and methods for automatically retrieving and providing digital advertisements from multiple channels with improved relevancy to a search query.

In various embodiments, a system including a non-transitory memory configured to store instructions thereon and at least one processor is disclosed. The at least one processor is configured to read the instructions to: obtain, from a computing device, a search request identifying a query and seeking items to be displayed on a webpage of a website to a user; search, based on the query, a first database to retrieve a first set of sponsored items associated with the website, wherein the first set of sponsored items are retrieved and ranked based on an optimization of conversion rate; search, based on the query, a second database to retrieve a second set of sponsored items associated with the website, wherein the second set of sponsored items are retrieved and ranked based on an optimization of click-through rate; generate, based on the first set of sponsored items and the second set of sponsored items, a ranked list of recommended items based on an advertisement auction mechanism; and transmit, to the computing device, the ranked list of recommended items in response to the search request.

In various embodiments, a computer-implemented method is disclosed. The computer-implemented method includes: obtaining, from a computing device, a search request identifying a query and seeking items to be displayed on a webpage of a website to a user; searching, based on the query, a first database to retrieve a first set of sponsored items associated with the website, wherein the first set of sponsored items are retrieved and ranked based on an optimization of conversion rate; searching, based on the query, a second database to retrieve a second set of sponsored items associated with the website, wherein the second set of sponsored items are retrieved and ranked based on an optimization of click-through rate; generating, based on the first set of sponsored items and the second set of sponsored items, a ranked list of recommended items based on an advertisement auction mechanism; and transmitting, to the computing device, the ranked list of recommended items in response to the search request.

In various embodiments, a non-transitory computer readable medium having instructions stored thereon is disclosed. The instructions, when executed by at least one processor, cause at least one device to perform operations including: obtaining, from a computing device, a search request identifying a query and seeking items to be displayed on a webpage of a website to a user; searching, based on the query, a first database to retrieve a first set of sponsored items associated with the website, wherein the first set of sponsored items are retrieved and ranked based on an optimization of conversion rate; searching, based on the query, a second database to retrieve a second set of sponsored items associated with the website, wherein the second set of sponsored items are retrieved and ranked based on an optimization of click-through rate; generating, based on the first set of sponsored items and the second set of sponsored items, a ranked list of recommended items based on an advertisement auction mechanism; and transmitting, to the computing device, the ranked list of recommended items in response to the search request.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
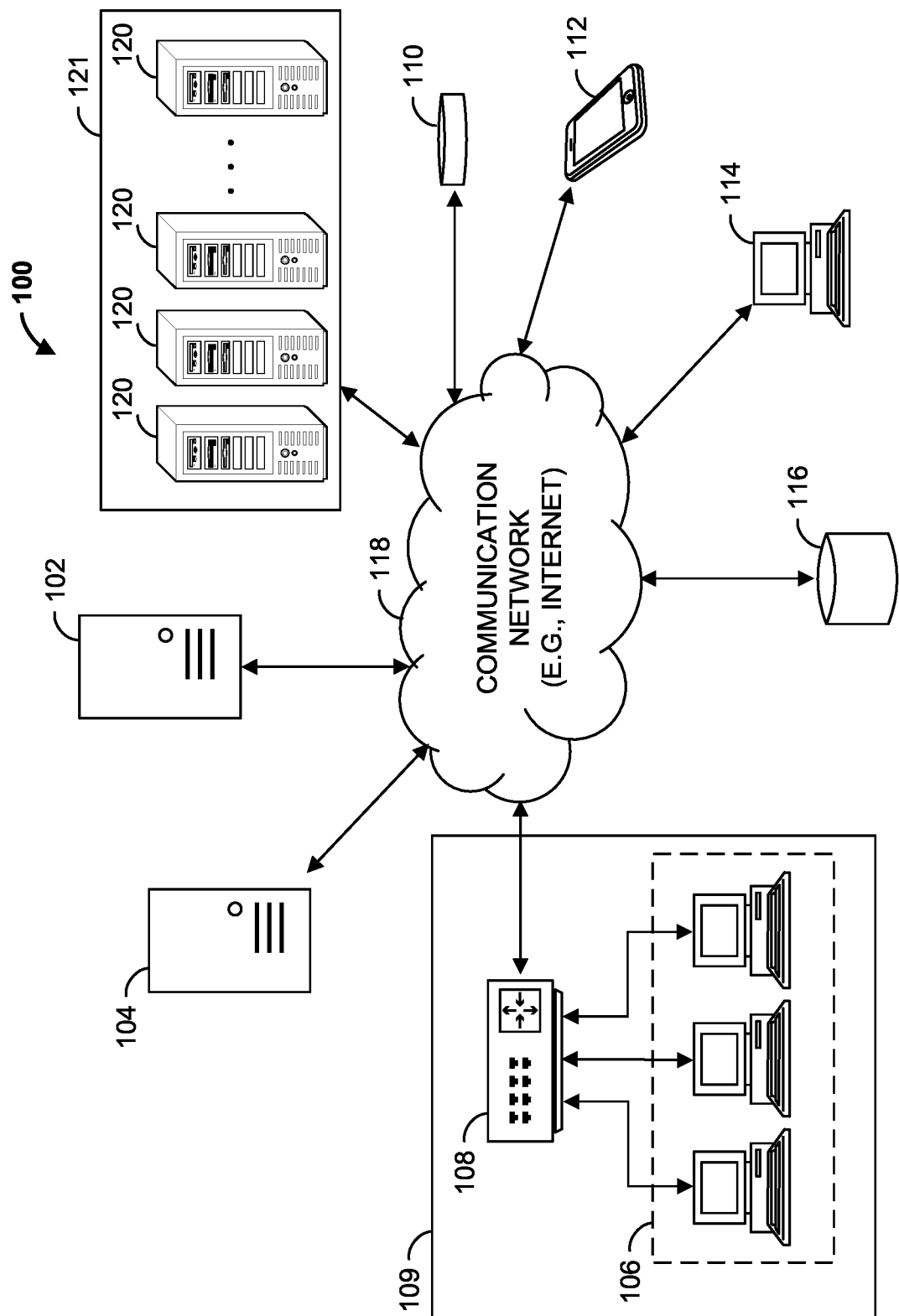
FIG. 1 is a network environment configured to provide digital advertisements with ensured relevancy to a search query, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

In e-commerce, items can be recommended to a user (e.g. an online customer of a retailer) who is browsing a website. For example, in response to a query submitted by the user on the website, advertised or sponsored items may be presented to the user. While the advertisement revenue of the website depends on the user's clicks and engagement with the sponsored items, the user's propensity of click and engagement often depends on the relevancy of the sponsored items to the query. As such, it is of paramount importance to ensure relevancy of sponsored items advertised on the website.

One goal of various embodiments in the present teaching is to provide an end-to-end system for automatically retrieving sponsored items from multiple channels and providing a unified ranking of the sponsored items with improved relevancy to a search query. In some embodiments, the system includes a multi-channel retrieval scheme with different optimization goals, relevancy thresholding, advertisement merging and ranking.

In some embodiments, based on whether a query is associated with an implicit intent, sponsored items are retrieved from one or more channels in parallel, e.g. based on different optimization goals and different matching criteria (e.g. liberal matching or semantic matching to the query). When sponsored items are retrieved from multiple channels, a threshold may be applied at each channel to filter out items whose relevancy is below the threshold. A ranking score may be computed for items from each channel.

To merge items retrieved from different channels, a unified ranking score may be computed based on a linear combination of ranking scores computed from different channels, and used to generate a unified list of sponsored items. In addition, the unified list of sponsored items may be further filtered to ensure relevancy to the query. An advertisement auction mechanism may be utilized to re-rank the unified list of sponsored items based on cost-per-click data from different advertisers for different sponsored items. Then a ranked list of recommended items may be generated after local inventory availability check, and transmitted to be displayed in a search result webpage in response to the query.

The disclosed systems and methods can optimize over advertisement revenue with a minimum impact on the prevailing and active campaigns. In some embodiments, a relevance improvement and evaluation method ensures high-relevant and medium-relevant advertisements can pass through a relevance gating, while low-relevant advertisements are filtered out. In some embodiments, an item recommendation system determines whether a sponsored item is eligible to be recommended or not, in response to the query, based on a relevance score. For example, the relevance score may be compared to a threshold. The sponsored item is determined to be eligible to be recommended when the relevance score is beyond the threshold. The sponsored item is determined to be ineligible to be recommended when the relevance score is not beyond the threshold. Only the eligible items may be displayed, after some filtering and rankings, on a search results webpage in response to the query. In some embodiments, the threshold is selected from a plurality of thresholds, based on the query and the item, at different granularity levels, e.g. query-product type (PT) level, PT level, category level, business department level, etc.

Furthermore, in the following, various embodiments are described with respect to methods and systems for automatically retrieving and providing digital advertisements from multiple channels with improved relevancy to a search query are disclosed. In some embodiments, based on a query, a first set of sponsored items is retrieved and ranked based on an optimization of conversion rate, and a second set of sponsored items is retrieved and ranked based on an optimization of click-through rate. Based on the first set of sponsored items and the second set of sponsored items, a ranked list of recommended items is generated for display based on an advertisement auction mechanism, in response to the query.

Turning to the drawings, FIG. 1 is a network environment 100 configured to provide digital advertisements with ensured relevancy to a search query, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, an item recommendation computing device 102 (e.g., a server, such as an application server), a web server 104, a cloud-based engine 121 including one or more processing devices 120, workstation(s) 106, a database 116, and one or more customer computing devices 110, 112, 114 operatively coupled over the network 118. The item recommendation computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the item recommendation computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the item recommendation computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the item recommendation computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109, for example. The workstation(s) 106 can communicate with the item recommendation computing device 102 over the communication network 118. The workstation(s) 106 may send data to, and receive data from, the item recommendation computing device 102. For example, the workstation(s) 106 may transmit data identifying items purchased by a customer at the store 109 to item recommendation computing device 102.

Although FIG. 1 illustrates three customer computing devices 110, 112, 114, the network environment 100 can include any number of customer computing devices 110, 112, 114. Similarly, the network environment 100 can include any number of the item recommendation computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of the customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the item recommendation computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the item recommendation computing device 102.

In some examples, the item recommendation computing device 102 may execute one or more models (e.g., algorithms), such as a machine learning model, deep learning model, statistical model, etc., to determine recommended items to advertise to the customer (i.e., item recommendations). The item recommendation computing device 102 may transmit the item recommendations to the web server 104 over the communication network 118, and the web server 104 may display advertisements for one or more of the recommended items on the website to the customer. For example, the web server 104 may display the recommended items to the customer on a homepage, a catalog webpage, an item webpage, a search results webpage, or a post-transaction webpage of the website (e.g., as the customer browses those respective webpages).

In some examples, the web server 104 transmits a recommendation request to the item recommendation computing device 102. The recommendation request may be sent together with a search query provided by the customer (e.g., via a search bar of the web browser), or a standalone recommendation request provided by a processing unit in response to the user's action on the website, e.g. interacting (e.g., engaging, clicking, or viewing) with one or more items, adding one or more items to cart, purchasing one or more items, opening or refreshing a homepage.

In one example, a customer selects an item on a website hosted by the web server 104, e.g. by clicking on the item to view its product description details, by adding it to shopping cart, or by purchasing it. The web server 104 may treat the item as an anchor item or query item for the customer, and send a recommendation request to the item recommendation computing device 102. In response to receiving the request, the item recommendation computing device 102 may execute the one or more processors to determine some recommended and/or sponsored items that are related (e.g. substitute or complementary) to the anchor item. The item recommendation computing device 102 may transmit some or all of the recommended items to the web server 104 to be displayed together with the anchor item to the customer.

In another example, a customer submits a search query on a website hosted by the web server 104, e.g. by entering a query in a search bar. The web server 104 may send a recommendation request to the item recommendation computing device 102. In response to receiving the request, the item recommendation computing device 102 may execute the one or more processors to first determine search results including organic items matching the search query, and then determine some sponsored items that are related to search query. The item recommendation computing device 102 may transmit the recommended items to the web server 104 to be displayed together with the search results to the customer.

The item recommendation computing device 102 is further operable to communicate with the database 116 over the communication network 118. For example, the item recommendation computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the item recommendation computing device 102, in some examples, the database 116 can be a local storage device, such as a hard drive, a non-volatile memory, or a USB stick. The item recommendation computing device 102 may store purchase data received from the web server 104 in the database 116. The item recommendation computing device 102 may also receive from the web server 104 user session data identifying events associated with browsing sessions, and may store the user session data in the database 116.

In some examples, the item recommendation computing device 102 generates training data for a plurality of models (e.g., machine learning models, deep learning models, statistical models, algorithms, etc.) based on historical user session data, search data, purchase data, catalog data, and/or advertisement data for the users. The item recommendation computing device 102 trains the models based on their corresponding training data, and the item recommendation computing device 102 stores the models in a database, such as in the database 116 (e.g., a cloud storage).

The models, when executed by the item recommendation computing device 102, allow the item recommendation computing device 102 to determine item recommendations for one or more items to advertise to a customer. For example, the item recommendation computing device 102 may obtain the models from the database 116. The item recommendation computing device 102 may then receive, in real-time from the web server 104, a recommendation request identifying a query submitted by the customer interacting with a website. In response to receiving the query, the item recommendation computing device 102 may execute the models to determine item recommendations for items (including sponsored items) to display to the customer.

In some embodiments, inputs to the models may include: user session data identifying actions (e.g., activity) of the customer on a website. For example, the user session data may identify item impressions, item clicks, items added to an online shopping cart, items purchased in an order, conversions, click-through rates, advertisements viewed, and/or advertisements clicked during an ongoing browsing session of the customer.

In some examples, the item recommendation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, item recommendation computing device 102 may generate ranked item recommendations for items to be displayed on the website to a user.

In some examples, the recommended items include sponsored items whose relevance scores with respect to the query are beyond a predetermined threshold. From the sponsored items passing the relevance guardrail, a ranked list of recommended items may be generated to be displayed as recommended content on the website based on some ranking and filtering models.

Figure 2:
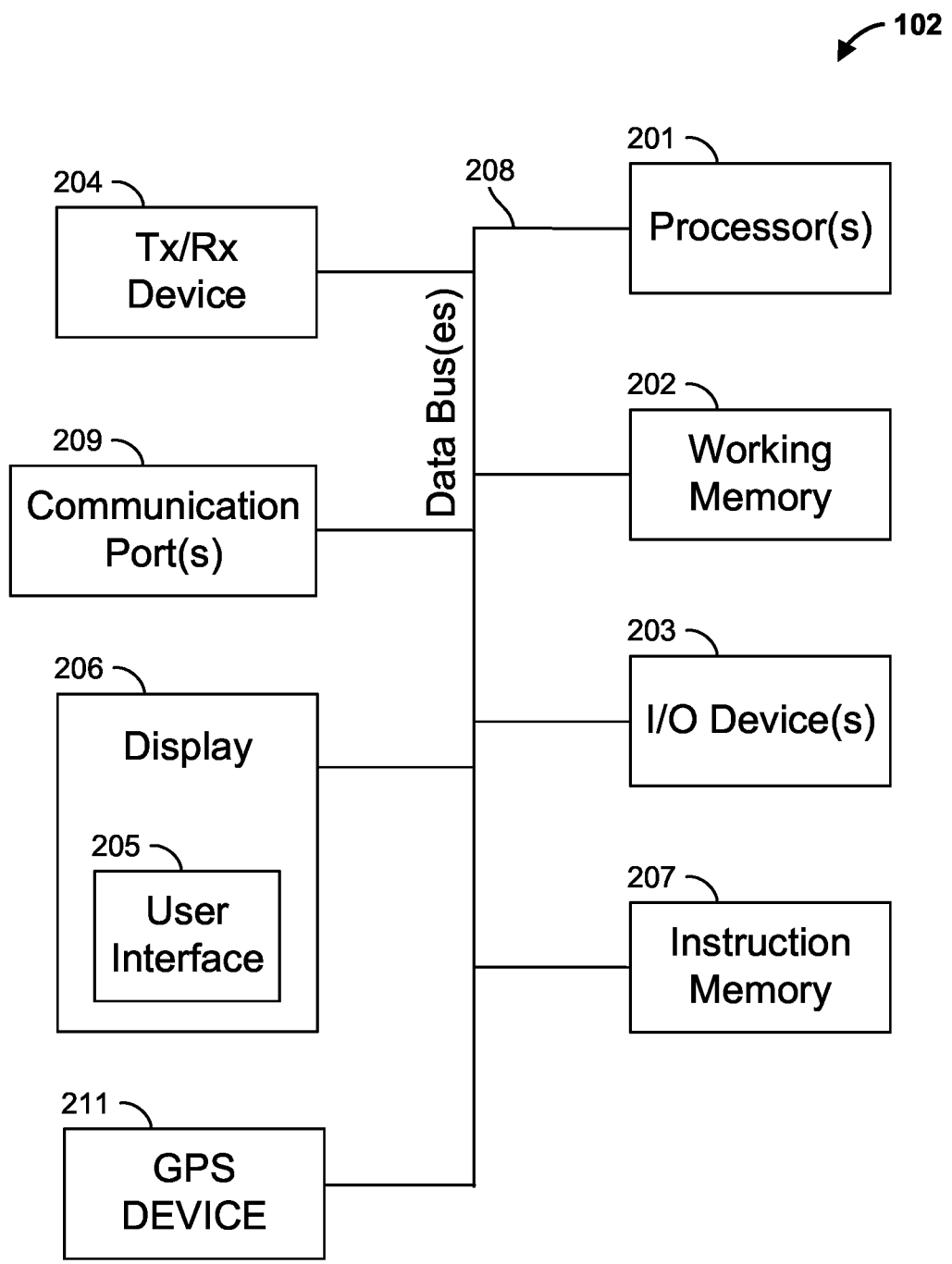
FIG. 2 is a block diagram of an item recommendation computing device, in accordance with some embodiments of the present teaching.

FIG. 2 illustrates a block diagram of an item recommendation computing device, e.g. the item recommendation computing device 102 of FIG. 1, in accordance with some embodiments of the present teaching. In some embodiments, each of the item recommendation computing device 102, the web server 104, the workstation(s) 106, the multiple customer computing devices 110, 112, 114, and the one or more processing devices 120 in FIG. 1 may include the features shown in FIG. 2. Although FIG. 2 is described with respect to the item recommendation computing device 102. It should be appreciated, however, that the elements described can be included, as applicable, in any of the item recommendation computing device 102, the web server 104, the workstation(s) 106, the multiple customer computing devices 110, 112, 114, and the one or more processing devices 120.

As shown in FIG. 2, the item recommendation computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the item recommendation computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the item recommendation computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the item recommendation computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the item recommendation computing device 102 may determine a local geographical area (e.g., town, city, state, etc.) of its position. Based on the geographical area, the item recommendation computing device 102 may determine relevant trend data (e.g., trend data identifying events in the geographical area).

Figure 3:
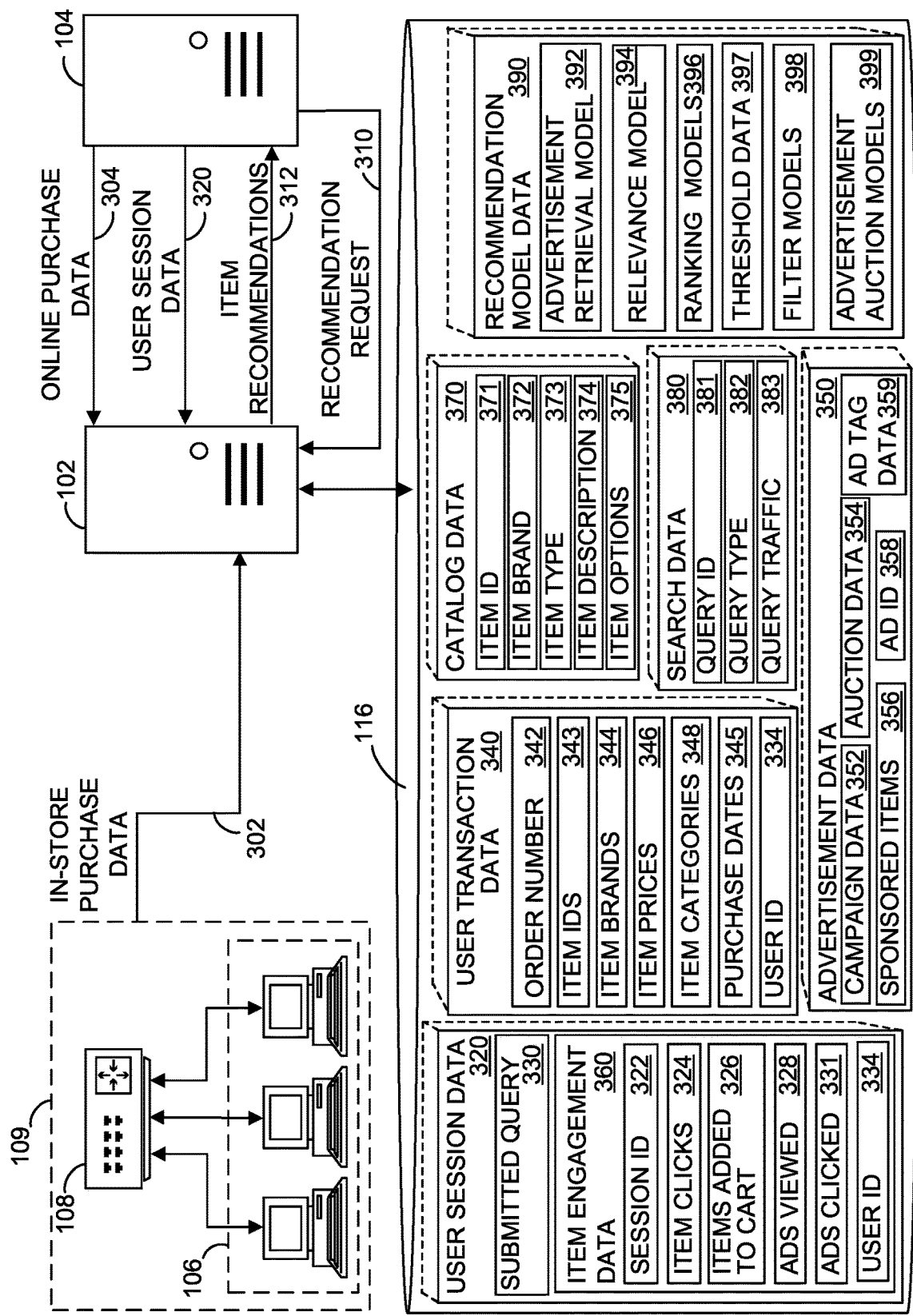
FIG. 3 is a block diagram illustrating various portions of an item recommendation system, in accordance with some embodiments of the present teaching.

FIG. 3 is a block diagram illustrating various portions of an item recommendation system, e.g. the item recommendation system shown in the network environment 100 of FIG. 1, in accordance with some embodiments of the present teaching. As indicated in FIG. 3, the item recommendation computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 360 and/or submitted query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

The submitted query data 330 may identify one or more searches conducted by a user during a browsing session (e.g., a current browsing session). For example, the item recommendation computing device 102 may receive a recommendation request 310 from the web server 104, where the recommendation request 310 may be associated with a query that identifies one or more search terms provided by the user. The item recommendation computing device 102 may store the search terms as provided by the user as submitted query data 330.

The item recommendation computing device 102 may also receive online purchase data 304 from the web server 104, which identifies and characterizes one or more online purchases, such as purchases made by the user and other users via a retailer's website hosted by the web server 104. The item recommendation computing device 102 may also receive in-store purchase data 302 from the store 109, which identifies and characterizes one or more in-store purchases. In some embodiments, the in-store purchase data 302 may also indicate availability of items in the store 109, and/or user IDs that have selected the store 109 as a default store for picking up online orders.

The item recommendation computing device 102 may parse the in-store purchase data 302 and the online purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., a product type like grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store search data 380, which may identify one or more attributes of a plurality of queries submitted by users on the website. The search data 380 may include, for each of the plurality of queries, a query ID 381 identifying a query previously submitted by users, a query type 382 (e.g., a head query, a torso query, or a tail query), and query traffic data 383 identifying how many times the query has been submitted or how many clicks the query has received.

In some embodiments, the query type 382 of a query is determined based on the query traffic data 383 of the same query. For example, after a query is submitted, one or more clicks may be received on items provided in response to the query. Then all queries can be ranked according to the number of clicks collected from the queries. In some embodiments, a query may be determined to be: a head query when the number of clicks collected from the query during a past time period is beyond a first percentile; a tail query when the number of clicks collected from the query during the past time period is below a second percentile that is lower than the first percentile; or a torso query when the number of clicks collected from the query during the past time period is between the first percentile and the second percentile. The past time period may the past day, past week, past month, past season, or past year. In some embodiments, the first percentile may be $90^{th}$, $80^{th}$, $70^{th}$, or $67^{th}$ percentile; the second percentile may be $40^{th}$, $33^{rd}$ or $30^{th}$ percentile.

The database 116 may also store advertisement data 350, which may identify one or more attributes of a plurality of advertisements for sponsored items on the website. The advertisement data 350 may include, for each of the plurality of advertisements, campaign data 352 identifying data of an advertising campaign for the advertisement, auction data 354 identifying auction information for the advertisement (e.g. default bidding price, a bidding scheme for the advertisement, historical auction results for the advertisement, etc.), sponsored item(s) 356 associated with the advertisement, an advertisement ID 358 identifying the advertisement, and ad tag data 359 identifying ad tags associated with the advertisement.

The database 116 may also store recommendation model data 390 identifying and characterizing one or more recommendation models and related data. For example, the recommendation model data 390 may include an advertisement retrieval model 392, a relevance model 394, one or more ranking models 396, threshold data 397, one or more filter models 398, and one or more advertisement auction models 399. The advertisement retrieval model 392 may be used to retrieve one or more sponsored items to be advertised in response to a query. For example, the query may be obtained by the item recommendation computing device 102 via the recommendation request 310. In some embodiments, the sponsored items may be retrieved based on keyword matching between the query and item descriptions, like retrieving organic and unsponsored items. In some embodiments, the sponsored items may be retrieved based on their ad tag data 359.

The relevance model 394 may be used to generate a relevance score representing a degree of relevancy between a sponsored item and the query. In some embodiments, the relevance score is computed after the sponsored item is retrieved. In some embodiments, the relevance score is computed before or when the sponsored item is retrieved.

Based on the relevance scores of the retrieved sponsored items, one or more filter models 398 may be used to filter the retrieved sponsored items, to remove one or more ineligible items from items to be recommended. For example, for each sponsored item, the item recommendation computing device 102 can determine, based on the one or more filter models 398, whether the sponsored item is eligible to be recommended in response to the query. The determination may be based on a comparison between the relevance score of the sponsored item and a threshold. The threshold may be selected from the threshold data 397.

In some examples, the threshold is selected based on the query type 382 of the query. For example, when the query is a head query or a torso query, a first threshold is selected. A second threshold that is different from the first threshold may be selected when the query is a tail query. In some embodiments, the first threshold and the second threshold are associated with different granularities, respectively. The different granularities may include: query-PT level, PT level, category level, SBU level, etc.

The one or more ranking models 396 may be used to rank the filtered items, e.g. based on their respective relevance scores, or based on another score computed for each sponsored item. In some embodiments, the ranked items may be filtered again by one or more of the filter models 398, which may be machine learning models. In some embodiments, the re-filtered items may be ranked again by one or more of the ranking models 396, based on an advertisement auction process.

In some examples, the advertisement auction process may be performed based on the one or more advertisement auction models 399. For example, a second price auction may be performed according to an advertisement auction model, where each advertiser of the sponsored items (after filtering) can provide bidding price based on cost-per-click (CPC). In some embodiments, the CPC data regarding each sponsored item may have been pre-determined (e.g. pre-programmed) and pre-stored in the database 116. As such, the advertisement auction process may be performed efficiently in real-time, to collect bidding data like CPC data for the re-filtered sponsored items.

As such, the re-filtered items may be ranked again by one or more of the ranking models 396, based on their respective bidding data. In some embodiments, the re-ranked items may be further filtered, based on one or more of the filter models 398, e.g. to check local inventory availability of each sponsored item, to generate a ranked list of recommended items. In some embodiments, the item recommendations 312 may be generated based on the ranked list of recommended items. In some embodiments, one or more of the advertisement retrieval model 392, the relevance model 394, the one or more ranking models 396, the one or more filter models 398, and the one or more advertisement auction models 39 are machine learning models (e.g. deep learning models) that are pre-trained before being stored in the database 116.

In some examples, the item recommendation computing device 102 receives (e.g., in real-time) a recommendation request 310 associated with a query from the web server 104. In response, the item recommendation computing device 102 generates item recommendations 312 identifying recommended items to be advertised in response to the query, and transmits the item recommendations 312 to the web server 104. In some examples, the recommendation request 310 may be associated with an anchor item interacted by a user, e.g. an item clicked by the user to check a product description webpage of the item. In response, the item recommendation computing device 102 generates recommended items that are close to the anchor item.

In some embodiments, the item recommendation computing device 102 may assign one or more of the above described operations to a different processing unit or virtual machine hosted by the one or more processing devices 120. Further, the item recommendation computing device 102 may obtain the outputs of the these assigned operations from the processing units, and generate the item recommendations 312 based on the outputs.

Figure 4:
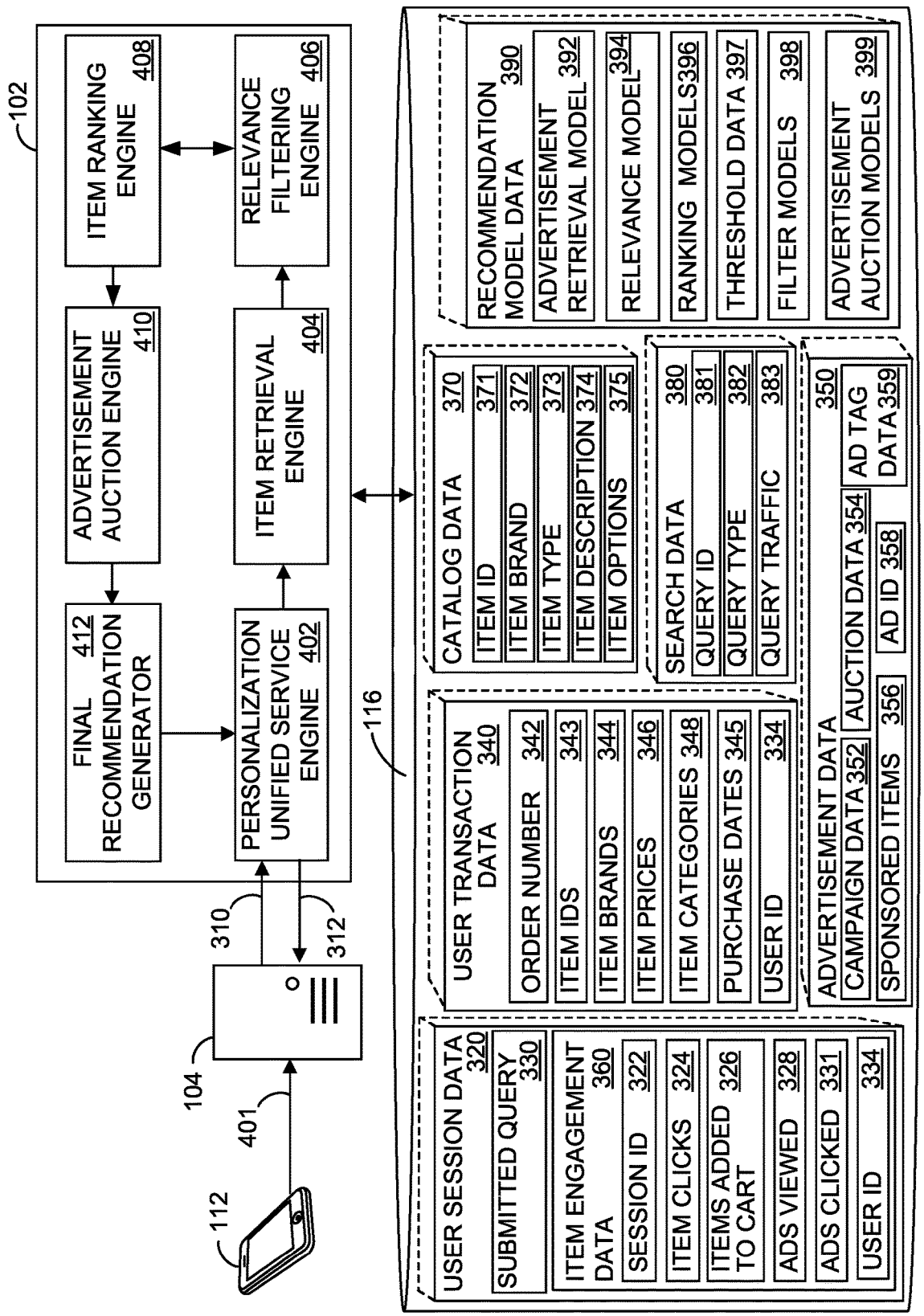
FIG. 4 is a block diagram illustrating various portions of an item recommendation computing device, in accordance with some embodiments of the present teaching.

FIG. 4 is a block diagram illustrating a more detailed view of an item recommendation computing device, e.g. the item recommendation computing device 102 in FIG. 1, in accordance with some embodiments of the present teaching. As shown in FIG. 4, the item recommendation computing device 102 includes a personalization unified service engine 402, an item retrieval engine 404, a relevance filtering engine 406, an item ranking engine 408, an advertisement auction engine 410, and a final recommendation generator 412. In some examples, one or more of the personalization unified service engine 402, the item retrieval engine 404, the relevance filtering engine 406, the item ranking engine 408, the advertisement auction engine 410, and the final recommendation generator 412 are implemented in hardware. In some examples, one or more of the personalization unified service engine 402, the item retrieval engine 404, the relevance filtering engine 406, the item ranking engine 408, the advertisement auction engine 410, and the final recommendation generator 412 are implemented as an executable program maintained in a tangible, non-transitory memory, such as instruction memory 207 of FIG. 2, which may be executed by one or processors, such as the processor 201 of FIG. 2.

For example, the personalization unified service engine 402 may obtain from the web server 104 a recommendation request 310 as a message 401 is sent from the user device 112 to the web server 104, and may execute recommendation model(s) included in the recommendation model data 390. The message 401 sent by the user using the user device 112 may indicate a search query or an anchor item interacted with by the user, or may just indicate a refresh of a webpage, e.g. a homepage of a website hosted by the web server 104. The recommendation request 310 may either include information about the anchor item, or indicate the anchor item in the user session data 320. In some embodiments, the recommendation request 310 is to seek one or more recommended items to be displayed on a webpage, which may be a home page of the website, a grocery page including grocery items, an item page including an anchor item described in the item page, or a promotion page including seasonal or holiday deals.

In this example, the web server 104 transmits a recommendation request 310 to the item recommendation computing device 102. The recommendation request 310 may include a request for item recommendations for presentation to a particular user using the user device 112. In some examples, the recommendation request 310 further identifies a user (e.g., customer) for whom the item recommendations are requested at the web server 104. The personalization unified service engine 402 receives the recommendation request 310, and receives and parses the user session data 320 (e.g., user session data associated with a current user session of the user in real-time). The personalization unified service engine 402 may provide to the item retrieval engine 404 the user session data 320 and/or other data, which may include the user transaction data 340, the search data 380, and/or the advertisement data 350 extracted from the database 116.

In some embodiments, the item retrieval engine 404 can obtain or collect various data with respect to the recommendation request 310, either from the personalization unified service engine 402 or directly from the database 116. In some embodiments, the item retrieval engine 404 can retrieve a first set of sponsored items associated with the website based on the query indicated by the recommendation request 310. This retrieval may be performed in the same manner as retrieving unsponsored items based on the query, e.g. by matching the query to item descriptions 374 and/or item brands 372 of the items. In some embodiments, the first set of sponsored items are retrieved based on an optimization of conversion rate.

In some embodiments, the item retrieval engine 404 can determine whether the query indicated by the recommendation request 310 is associated with an explicit intent or an implicit intent of the user using the user device 112. Based on a determination that the query is not associated with an explicit intent or an implicit intent of the user, the item retrieval engine 404 may further retrieve a second set of sponsored items associated with the website based on the ad tag data 359 of various sponsored items. In some embodiments, the second set of sponsored items are retrieved based on an optimization of click-through rate.

In some embodiments, when the query is not associated with an explicit intent or an implicit intent of the user, the item retrieval engine 404 may further retrieve a third set of sponsored items associated with the website based on the ad tag data 359. In some embodiments, the third set of sponsored items are retrieved based on an optimization of click-through rate. In some examples, while each of the second set of sponsored items is retrieved based on a literal match to the query; and each of the third set of sponsored items is retrieved based on a semantic match to the query. The item retrieval engine 404 may send each retrieved set of sponsored items to the relevance filtering engine 406 for filtering.

The relevance filtering engine 406 can filter the retrieved items based on their relevance scores. In some embodiments, the relevance scores are computed by the relevance filtering engine 406 based on the relevance model 394. In some embodiments, the relevance scores may be the same as the retrieval scores computed and used by the item retrieval engine 404 when retrieving the sponsored items.

In some examples, the relevance filtering engine 406 can compare the relevance score of each retrieved sponsored item to one of the thresholds stored in the filter models 398, at a certain granularity related to the sponsored item, e.g. a product type of the item, a category of the item, or a service business unit for the item. As such, for each retrieved set of sponsored items, the relevance filtering engine 406 can filter out low-relevancy sponsored items whose relevance scores with respect to the query are below the corresponding threshold. The relevance filtering engine 406 may send the filtered items to the item ranking engine 408.

In some embodiments, the item ranking engine 408 may use one or more of the ranking models 396 to rank the filtered items that pass the relevance-based thresholds at the relevance filtering engine 406. In some examples, the filtered items coming from the first set of sponsored items are ranked based on ranking scores computed to optimize a conversion rate of the items. In some examples, the filtered items coming from the second set and third set of sponsored items are ranked based on ranking scores computed to optimize a click-through rate of the items.

In some embodiments, the item ranking engine 408 merges the three sets of sponsored items to generate a unified set of sponsored items. The item ranking engine 408 can compute a unified re-rank score for each item in the unified set, and rank the sponsored items in the unified set according to their respective unified re-rank scores. In some embodiments, the item ranking engine 408 may send the unified set of sponsored items back to the relevance filtering engine 406 for further filtering, e.g. based on one or more machine learning models of the filter models 398. The item ranking engine 408 may receive a filtered unified set of sponsored items from the relevance filtering engine 406, and send the filtered unified set of sponsored items to the advertisement auction engine 410.

The advertisement auction engine 410 may re-rank the filtered unified set of sponsored items, based on an advertisement auction mechanism, e.g. according to one or more of the advertisement auction models 399. For example, based on some pre-stored or pre-programmed CPC data for each sponsored item in the filtered unified set, the unified re-rank score for each item is updated. As such, a higher CPC bid for a sponsored item may increase the rank of the sponsored item, compared to other sponsored items with similar unified re-rank scores but lower CPC bids. The advertisement auction engine 410 may thus generate an auction-based set of sponsored items that are ranked based on their updated unified re-rank scores, and send the auction-based set of sponsored items to the final recommendation generator 412.

The final recommendation generator 412 in this example may obtain the auction-based set of sponsored items from the advertisement auction engine 410, and generate a ranked list of recommended items in response to the query. In some embodiments, the ranked list of recommended items may be generated by filtering the auction-based set of sponsored items with a local inventory availability check. For example, a sponsored item that is not available in a local store or inventory of a user submitting the query (e.g. based on a zip code entered by the user), may be filtered out from the auction-based set of sponsored items.

In some embodiments, the final recommendation generator 412 may generate the item recommendations 312 based on the ranked list of recommended items. In some embodiments, the item recommendations 312 include the ranked list of recommended items and position information for each recommended item. In some examples, each of the ranked list of recommended items has a corresponding rank and is recommended to be displayed at a corresponding position in a webpage based on its corresponding rank. For example, a higher ranked item may be recommended to be displayed at a more popular position in the webpage. The final recommendation generator 412 may send the item recommendations 312 to the personalization unified service engine 402.

The personalization unified service engine 402 may receive the item recommendations 312 from the final recommendation generator 412 in a data format (e.g., message) acceptable by the web server 104. The personalization unified service engine 402 transmits the item recommendations 312 to web server 104. The web server 104 may then update or generate item recommendations for presentation to the user via the user device 112 based on the item recommendations 312. For example, the item recommendations may be displayed on a webpage showing a product description of the anchor item to the user, on a webpage showing search results in response to a query to the user, on a webpage showing a shopping cart including the anchor item to the user, on a webpage showing an order of the anchor item placed by the user, and/or on a homepage of a website.

Figure 5:
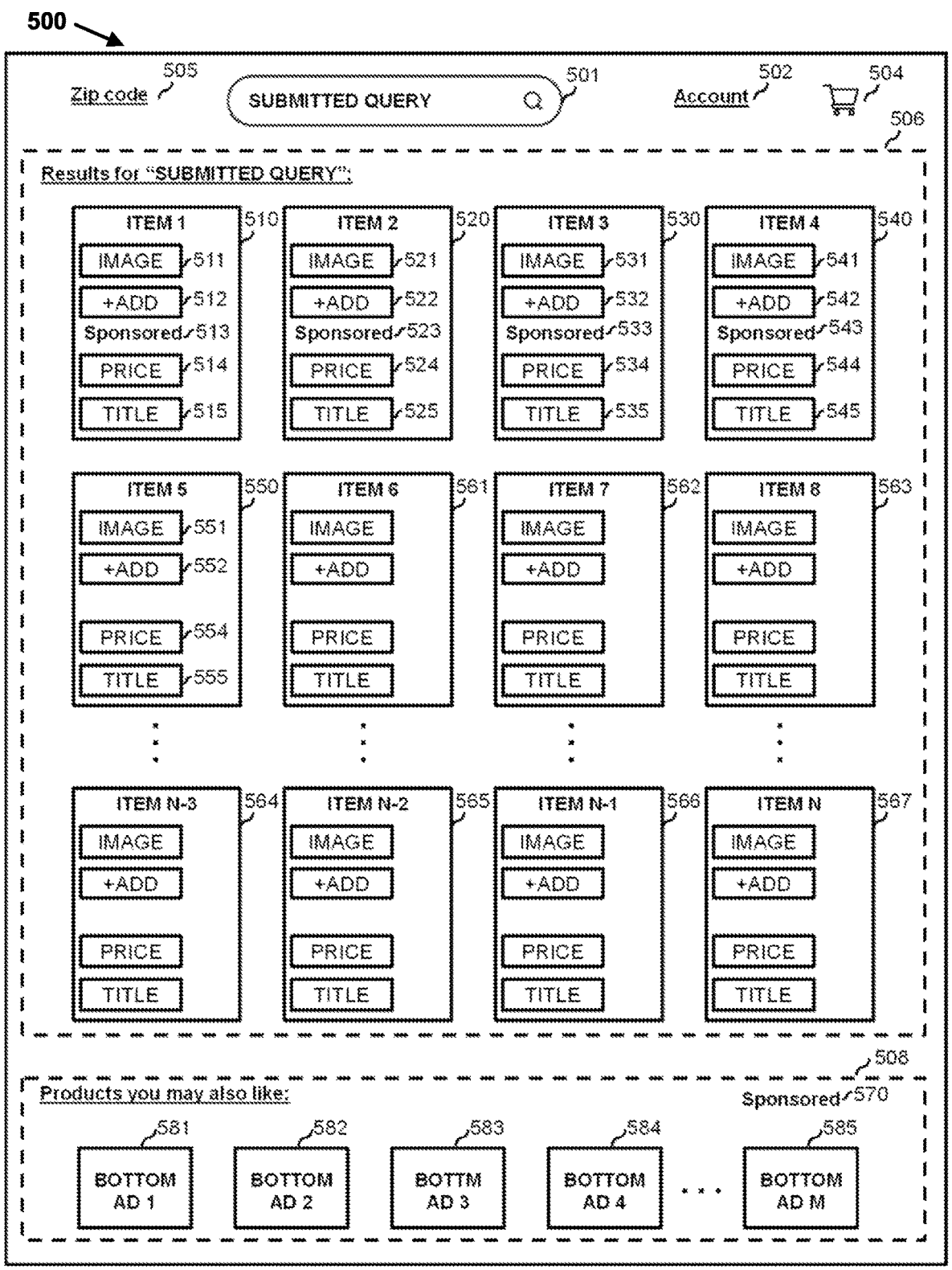
FIG. 5 illustrates an exemplary webpage displaying recommended items, in accordance with some embodiments of the present teaching.

FIG. 5 illustrates an exemplary webpage 500 displaying recommended items, in accordance with some embodiments of the present teaching. In some embodiments, the webpage 500 is on a retailer's website hosted by, for example, the web server 104, and may display item recommendations 312 generated by the item recommendation computing device 102 in response to the recommendation request 310.

For example, the web server 104 may receive a query from a user. As shown in FIG. 5, the webpage 500 includes a search box 501, where a user has entered a query "SUBMITTED QUERY." In response to the query, the web server 104 may send the recommendation request 310 to the item recommendation computing device 102, to obtain the item recommendations 312 generated by the item recommendation computing device 102, e.g. following the methods and systems disclosed above. In this example, the webpage 500 is a search result webpage generated in response to the query "SUBMITTED QUERY."

Based on the item recommendations 312, the web server 104 may display various items in the webpage 500. For example, the webpage 500 includes a first recommendation section 506 displaying search results for the "SUBMITTED QUERY." As shown in FIG. 5, the first recommendation section 506 includes N items listed in a grid-based layout. Among the N items, the first four items 510~540 are sponsored items, while other items 550, 561~567 are unsponsored or organic items.

In this example, for each of the N items in the first recommendation section 506, the web server 104 may display one or more of: an image of the item, a price for the item, a title for the item, and an add-to-cart icon that allows the user to add the item to an online shopping cart 504 associated with the webpage 500. In addition, each of the four sponsored items 510~540 may further include a label "Sponsored" displayed in the corresponding block to indicate that the item is a sponsored item. For example, as illustrated, item 1 510 is a sponsored item including: image 511, add-to-cart icon 512, "Sponsored" label 513, price 514, and title 515. Similarly, item 2 520 is a sponsored item including: image 521, add-to-cart icon 522, "Sponsored" label 523, price 524, and title 525. The sponsored item 3 530 includes: image 531, add-to-cart icon 532, "Sponsored" label 533, price 534, and title 535. The sponsored item 4 540 includes: image 541, add-to-cart icon 542, "Sponsored" label 543, price 544, and title 545.

In contrast, the item 5 550 is an unsponsored or organic item including: image 551, add-to-cart icon 552, price 554, and title 555, without a "Sponsored" label. Similarly, the other unsponsored or organic items 561~567 all include similar elements to the item 5 550, without including any "Sponsored" label.

In some embodiments, the first recommendation section 506 may be called an in-grid recommendation section. Each item in the in-grid recommendation section may be called an in-grid item. Each advertisement in the in-grid recommendation section may be called an in-grid advertisement.

In some embodiments, depending on what the "SUBMITTED QUERY" is, there may be more or less sponsored items in the first recommendation section 506. For example, when a head query related to a popular product is submitted by a same user, there may be many highly relevant sponsored items retrieved, such that more than four sponsored items are displayed in the first recommendation section 506. In contrast, when a tail query related to a niche product is submitted by the same user, there may be only a few relevant sponsored items retrieved, such that less than four sponsored items are displayed in the first recommendation section 506.

In some embodiments, based on the item recommendations 312, the web server 104 may also display bottom advertisements in addition to the in-grid advertisements in a search result webpage. For example, the webpage 500 also includes a second recommendation section 508 displaying additional sponsored items for the user below the first recommendation section 506. As shown in FIG. 5, the second recommendation section 508 includes M sponsored items 581~585 listed in one row.

In some embodiments, the second recommendation section 508 may be called a bottom recommendation section. Each item in the bottom recommendation section may be called a bottom item. Each advertisement in the bottom recommendation section may be called a bottom advertisement. In some embodiments, each of the M sponsored items 581~585 may include elements similar to an in-grid item, e.g. an image of the item, a price for the item, a title for the item, and an add-to-cart icon that allows the user to add the item to the online shopping cart 504. Instead of labeling each bottom item in the second recommendation section 508, a general "Sponsored" label 570 is displayed in the second recommendation section 508 to indicate that all items in the second recommendation section 508 are sponsored items. These sponsored items in the second recommendation section 508 may be interesting to the user, given the "SUBMITTED QUERY" and/or the user's previous activity on the website.

In some embodiments, the first four sponsored items in the first recommendation section 506 are the top four ranked sponsored items in the item recommendations 312; while the other sponsored items in the item recommendations 312 are listed as the bottom items 581~585, according to their ranks in the item recommendations 312.

As shown in FIG. 5, the webpage 500 also includes an account icon 502, which, when engaged (e.g., clicked on) by a user, facilitates the user to log in an account of the website. In addition, the webpage 500 also includes a zip code icon 505, which, when engaged (e.g., clicked on) by a user, facilitates the user to enter a zip code the user is interested in. For example, the zip code may indicate: where the user wants to pick up an online order, or where the user wants to delivery an online order. In some examples, a zip code entered by the user may be stored in association with the user's account, such that a zip code is activated once the user logs in the associated account.

In some embodiments, once the zip code is updated, the sponsored items in the first recommendation section 506 and the second recommendation section 508 may also be updated for the same "SUBMITTED QUERY." This is because local inventory availability for the sponsored items may be different for different zip codes.

Figure 6:
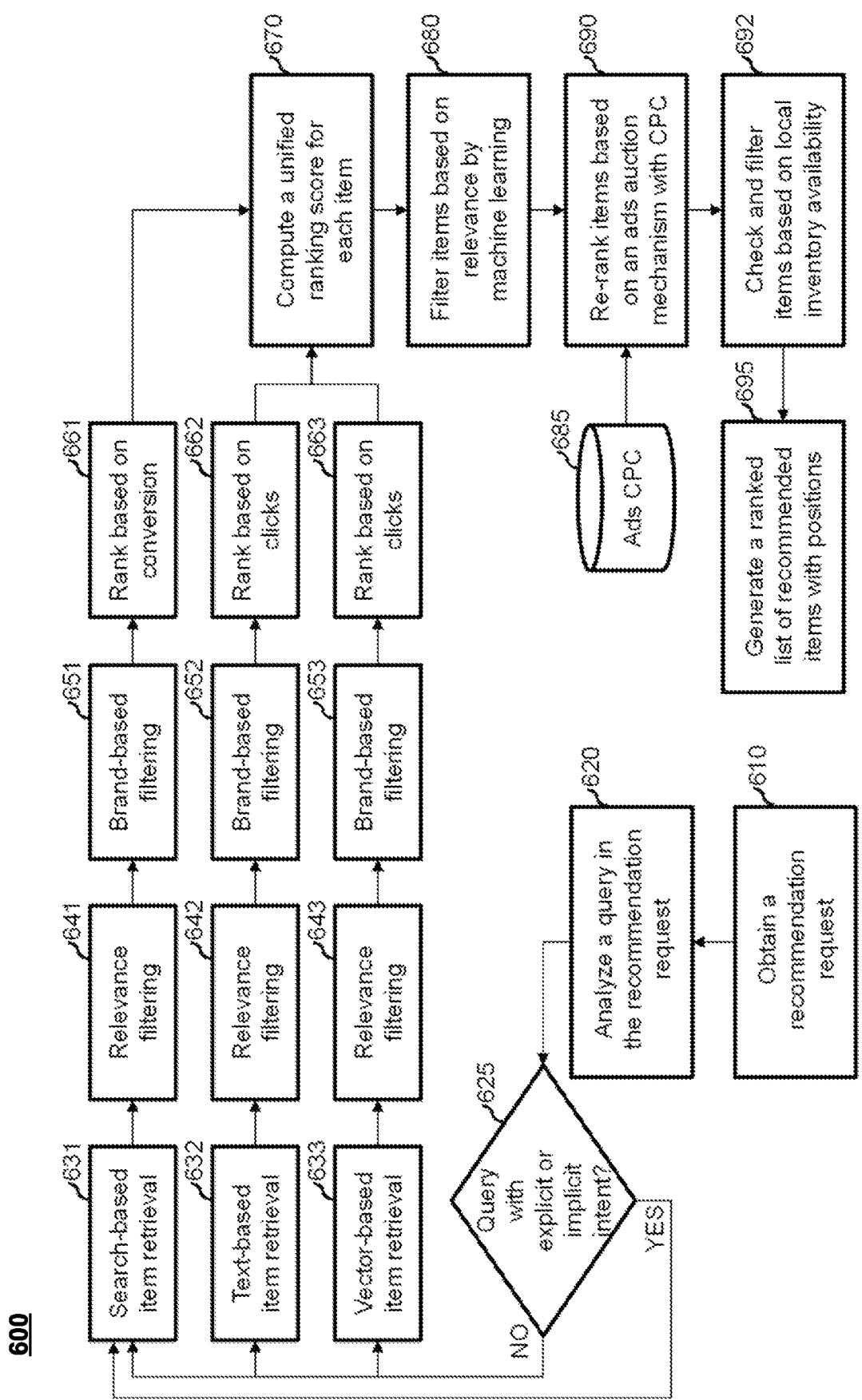
FIG. 6 illustrates a process for determining sponsored items in response to a recommendation request, in accordance with some embodiments of the present teaching.

FIG. 6 illustrates a process 600 for determining sponsored items in response to a recommendation request, in accordance with some embodiments of the present teaching. In some embodiments, the process 600 may be carried out by one or more computing devices, such as the item recommendation computing device 102 and/or the cloud-based engine 121 of FIG. 1. As shown in FIG. 6, the process 600 starts from operation 610, where a recommendation request is obtained. For example, the item recommendation computing device 102 may receive from the web server 104 a recommendation request, which is a search request identifying a query and seeking items to be displayed on a webpage of a website to a user, where the website is hosted by the web server 104.

At operation 620, the query is analyzed, e.g. to determine whether the query is associated with an explicit intent or an implicit intent of the user. For example, an explicit intent may be determined based on an explicit facet filter. For example, an implicit intent may be determined based on a perceive application programming interface (API). In some examples, when the query contains a term for an item, an associated explicit or implicit intent may reflect a brand, color and/or size of the item the user is interested in.

At operation 625, it is determined whether the query is associated with an explicit or implicit intent. If so, the process goes through a first route including operations 631, 641, 651 and 661 to retrieve and rank a first set of sponsored items associated with the website. Otherwise, the process goes through two additional routes in addition to the first route, to retrieve and rank a second set of sponsored items and a third set of sponsored items, respectively. As shown in FIG. 6, the two additional routes includes: a second route including operations 632, 642, 652 and 662; and a third route including operations 633, 643, 653 and 663. In some embodiments, the first set of sponsored items are retrieved and ranked based on an optimization of conversion rate; while the second set of sponsored items and the third set of sponsored items are retrieved and ranked based on an optimization of click-through rate.

Each route corresponds to a respective channel identifying a corresponding source and manner for retrieving items. The query intent is determined at the operation 625 to determined which channel is activated for advertisement retrieval or sponsored item retrieval. When the query has implicit intent, only the first channel is used for retrieving. When the query does not have implicit intent, all channels are activated for retrieving.

As such, regardless of whether or not the query is associated with an explicit or implicit intent, the query is utilized to perform a search-based item retrieval at operation 631. In some embodiments, during the search-based item retrieval at operation 631, a first database is searched based on the query to retrieve the first set of sponsored items. In some embodiments, the first database may be part of the database 116 or a standalone database. For example, the catalog data 370 and the sponsored item data 356 in the database 116 may be searched to determine sponsored items whose item descriptions and/or item brands can match the query, literally or semantically. This search process is similar to a search process when the query is utilized to search for unsponsored items matching the query, except that the sponsored item data 356 is utilized to verify the retrieved items at operation 631 are sponsored.

At operation 641, a relevance-based filtering is performed to filter out, among the first set of sponsored items retrieved from operation 631, each item whose relevance score is below a corresponding threshold. In some embodiments, at the operation 641, the item recommendation computing device 102 may compute, for each sponsored item in the first set of sponsored items, a relevance score representing a degree of relevancy between the sponsored item and the query, and filter the first set of sponsored items based on their relevance scores and at least one predetermined threshold selected based on the threshold data 397.

In some embodiments, when the query includes a brand, the first set of sponsored items is further filtered based on a brand-based filtering at operation 651, to generate a first filtered set of sponsored items. For example, the first filtered set of sponsored items may include sponsored items having brands matching the brand in the query, and having relevance scores higher than the at least one predetermined threshold.

At operation 661, a first ranking score is generated for each of the first filtered set of sponsored items using a first machine learning model, e.g. one of the ranking models 396. In some embodiments, the first ranking score represents a likelihood of conversion of the corresponding item. As such, the first filtered set of sponsored items are ranked based on their respective first ranking scores. In some embodiments, top N1 ranked sponsored items are selected from the first filtered set based on their respective first ranking scores, to generate a first selected set of sponsored items. N1 may be an integer up to a predetermined first number M1, which may be e.g. 128. That is, if the total number of sponsored items in the first filtered set is less than M1, all sponsored items in the first filtered set are selected (i.e. N1<M1); if the total number of sponsored items in the first filtered set is larger than or equal to M1, M1 sponsored items in the first filtered set are selected (i.e. N1=M1).

When it is determined at operation 625 that the query is not associated with an explicit or implicit intent of the user, the query is also utilized to perform a text-based item retrieval at operation 632. In some embodiments, during the text-based item retrieval at operation 632, a second database is searched based on the query to retrieve the second set of sponsored items. In some embodiments, the second database may be part of the database 116 or a standalone database. For example, the ad tag data 359 in the database 116 may be searched to determine sponsored items in the second set whose ad tag data can match the query based on a literal text-level matching.

At operation 642, a relevance-based filtering is performed to filter out, among the second set of sponsored items retrieved from operation 632, each item whose relevance score is below a corresponding threshold. In some embodiments, at the operation 642, the item recommendation computing device 102 may compute, for each sponsored item in the second set of sponsored items, a relevance score representing a degree of relevancy between the sponsored item and the query, and filter the second set of sponsored items based on their relevance scores and at least one predetermined threshold selected based on the threshold data 397.

In some embodiments, when the query includes a brand, the second set of sponsored items is further filtered based on a brand-based filtering at operation 652, to generate a second filtered set of sponsored items. For example, the second filtered set of sponsored items may include sponsored items having brands matching the brand in the query, and having relevance scores higher than the at least one predetermined threshold.

At operation 662, a second ranking score is generated for each of the second filtered set of sponsored items using a second machine learning model, e.g. one of the ranking models 396. In some embodiments, the second ranking score represents a likelihood of click of the corresponding item. As such, the second filtered set of sponsored items are ranked based on their respective second ranking scores. In some embodiments, top N2 ranked sponsored items are selected from the second filtered set based on their respective second ranking scores, to generate a second selected set of sponsored items. N2 may be an integer up to a predetermined second number M2, which may be e.g. 60. That is, if the total number of sponsored items in the second filtered set is less than M2, all sponsored items in the second filtered set are selected (i.e. N2<M2); if the total number of sponsored items in the second filtered set is larger than or equal to M2, M2 sponsored items in the second filtered set are selected (i.e. N2=M2).

In addition, when it is determined at operation 625 that the query is not associated with an explicit or implicit intent of the user, the query is also utilized to perform a vector-based item retrieval at operation 633. In some embodiments, during the vector-based item retrieval at operation 633, the second database is searched based on the query to retrieve the third set of sponsored items. In some examples, the ad tag data 359 in the database 116 may be searched to determine sponsored items in the third set whose ad tag data can match the query based on a sematic vector-level matching.

In some embodiments, during all of the three item retrieval operations 631, 632, 633, a same database is searched based on the query to retrieve the three different sets of sponsored items. The three different sets of sponsored items are retrieved and ranked based on different optimization goals and/or different retrieval matching mechanisms.

At operation 643, a relevance-based filtering is performed to filter out, among the third set of sponsored items retrieved from operation 633, each item whose relevance score is below a corresponding threshold. In some embodiments, at the operation 643, the item recommendation computing device 102 may compute, for each sponsored item in the third set of sponsored items, a relevance score representing a degree of relevancy between the sponsored item and the query, and filter the third set of sponsored items based on their relevance scores and at least one predetermined threshold selected based on the threshold data 397.

In some embodiments, the relevance scores may not be homogeneous across the three routes or three channels. For example, the operation 642 may generate a normalized Solr score based on Apache Solr for each item retrieved in the second route, while the operation 643 may generate a cosine similarity score for each item retrieved in the third route. As such, different thresholds may be used for different channels or routes. Each of the operations 641, 642, 643 provides a relevance gating mechanism to ensure only high quality advertisements can pass through for recommendation. In some embodiments, each of the operations 641, 642, 643 may be performed based on a data mining model or a machine learning model.

In some embodiments, when the query includes a brand, the third set of sponsored items is further filtered based on a brand-based filtering at operation 653, to generate a third filtered set of sponsored items. For example, the third filtered set of sponsored items may include sponsored items having brands matching the brand in the query, and having relevance scores higher than the at least one predetermined threshold. In some embodiments, each brand-based filtering at operations 651, 652, 653 is configurable and can be turned off depending on some test results.

At operation 663, a third ranking score is generated for each of the second filtered set of sponsored items using a third machine learning model, e.g. one of the ranking models 396. In some embodiments, the third ranking score represents a likelihood of click of the corresponding item. As such, the third filtered set of sponsored items are ranked based on their respective third ranking scores. In some embodiments, top N3 ranked sponsored items are selected from the third filtered set based on their respective second ranking scores, to generate a third selected set of sponsored items. N3 may be an integer up to a predetermined third number M3, which may be e.g. 60. That is, if the total number of sponsored items in the third filtered set is less than M3, all sponsored items in the third filtered set are selected (i.e. N3<M3); if the total number of sponsored items in the third filtered set is larger than or equal to M3, M3 sponsored items in the third filtered set are selected (i.e. N3=M3). In some embodiments, one or more of the ranking operations 661, 662, 663 may be performed together with the corresponding item retrieval operations 631, 632, 633. For example, when a sponsored item is retrieved, a ranking or retrieval score is computed and used to determine whether to retrieve the sponsored item and how to rank it compared to other retrieved items.

In some embodiments, the ranking scores are computed at each of the ranking operations 661, 662, 663 based on a respective machine learning model, e.g. one of the ranking models 396. In some embodiments, each machine learning model may be trained based on engagement signals related to items, including: user review number, average review rating, CTR in past three days, sales in past 30 days, etc. During inference, these engagement signals may be used to generate a ranking score for each item.

As such, a same query may be used to retrieve various data from different channels, based on different optimization goals. In some embodiments, while the first route (including operations 631, 641, 651 and 661) is used to retrieve sponsored items to optimize a conversion rate, the second route (including operations 632, 642, 652 and 662) is used to retrieve sponsored items to optimize a click through rate, and the third route (including operations 633, 643, 653 and 663) is also used to retrieve sponsored items to optimize a click through rate. While the second set of sponsored items retrieved from the second route is based on a literal match to the query; and the third set of sponsored items retrieved from the third route is based on a semantic match to the query. Based on the recommendation request, the item recommendation computing device 102 may collect back end data, which may include: user session data identifying website activities of users on the website, user transaction data identifying transactions of the users on the website, and/or catalog data identifying one or more attributes of items offered by the website.

At operation 670, the item recommendation computing device 102 may merge the three selected sets of sponsored items to generate a unified list of sponsored items, and compute, for each of the unified list of sponsored items, a unified ranking score. In some examples, when it is determined at operation 625 that the query is associated with an explicit or implicit intent of the user, only the first route will be pursued and only the first selected set of sponsored items will be provided to the operation 670. Then the unified ranking score for each sponsored item may be the same as the first ranking score computed at the operation 661, or may be based on a multiplication of the first ranking score by a scalar.

In some examples, when it is determined at operation 625 that the query is not associated with an explicit or implicit intent of the user, three routes are pursued as discussed above to generate the three selected sets of sponsored items. When a sponsored item exists only in one of the three selected sets of sponsored items, its unified ranking score may be computed based on the corresponding ranking score for the sponsored item from operation 661, 662 or 663.

There may be some overlaps among the three selected sets of sponsored items. For example, item A may be in both the first selected set and the second selected set. Then the unified ranking score of item A may be computed based on a weighted average of its first ranking score and its second ranking score. In another example, item B may be in both the first selected set and the third selected set. Then the unified ranking score of item B may be computed based on a weighted average of its first ranking score and its third ranking score.

In yet another example, item C may be in both the second selected set and the third selected set. Then the unified ranking score of item C may be computed based on a maximum of its second ranking score and its third ranking score. In a different example, item D may be in all of the three selected sets. Then the unified ranking score of item D may be computed based on a weighted average of its first ranking score and a maximum of its second ranking score and its third ranking score.

In general, the unified ranking score may be a linear or non-linear combination of the three ranking scores computed at operations 661, 662 and 663. In some embodiments, the unified ranking score for each sponsored item can be computed based on the following equation (1):

$$URS = W_m * S_m + W_s * S_s \qquad (1)$$

where URS represents the unified ranking score for an item, $S_m$ represents a maximum score between the item's second ranking score (from text-based retrieval) and third ranking score (from vector-based retrieval), $S_s$ represents the item's first ranking score (from search-based retrieval), $W_m$ and $W_s$ are corresponding weight parameters, and $W_m + W_s = 1$. In some examples, the URS prioritizes towards the first channel to maintain a stable transition of advertisement campaigns, meaning e.g. $W_s > W_m$. In some examples, when only one of the second ranking score and the third ranking score is available, $S_m$ is equal to that available score. In some examples, when none of the second ranking score and the third ranking score is available, $S_m$ is equal to zero. As such, the unified list of sponsored items generated by the operation 670 may be ranked according to their respective URS scores.

In some embodiments, at an optional operation 680, the unified list of sponsored items may be further filtered. For example, the unified ranking score of each sponsored item in the unified list may be compared with a dynamic threshold, which may be determined based on a machine learning model (e.g. one of the filter models 398) and a traffic segment of the query. The traffic segment may indicate how much traffic is received from the query, e.g. how many clicks are received after providing search results based on the query, how many times the query has been received, etc. The dynamic threshold may vary based on whether the query is a head query (e.g. a frequently searched query) or tail query (e.g. a less frequently searched query).

One purpose of the operation 680 is to double check relevance of the items using machine learning, to further ensure relevancy of the items to be recommended. After the filtering at the operation 680, only sponsored items beyond the dynamic threshold are selected from the unified list to generate a relevant list of sponsored items.

At operation 690, an advertisement auction mechanism may be utilized to re-rank the relevant list of sponsored items. For example, based on one of the advertisement auction models 399, cost per click (CPC) data associated with each of the relevant list of sponsored items is obtained from an advertisement CPC database 685, which may be part of the database 116 or a standalone database. For example, each advertiser of a corresponding sponsored item in the relevant list may submit a bid, e.g. automatically based on a pre-defined algorithm, in terms of CPC for the corresponding sponsored item.

Based on the CPC for each item and a predetermined price squashing parameter, the unified ranking score is modified to generate a re-ranking score for each sponsored item in the relevant list. As such, the relevant list of sponsored items are re-ranked based on their respective re-ranking scores. In some embodiments, the re-ranking score for each sponsored item in the relevant list can be computed based on the following equation (2):

$$RRS = CPC * URS^\beta \qquad (2)$$

where RRS represents the re-ranking score for an item, URS represents the unified ranking score for the item, and $\beta$ is a predetermined price squashing parameter.

In some embodiments, the price squashing parameter $\beta$ may be tunable and applied after there is a significant drop of gross merchandise value. In some embodiments, the value of $\beta$ may be the same for all items, and can be determined based on marketplace maturity and/or experiments. A larger β means more weights are put on the relevance score given a bidding CPC. A smaller β means less weights are put on the relevance score given a bidding CPC. But since the relevancy of each item has passed two rounds of filtering, the re-ranked sponsored items will be relevant enough to the query, however the bidding result is.

In some embodiments, at an optional operation 692, the re-ranked sponsored items may be further filtered based on item availability in local inventory for the user submitting the query. For example, when a zip code associated with an account of the user is available, the system can check whether each item in the re-ranked list from the operation 690 is available in a local store or inventory for the zip code. If not, the corresponding item is filtered out of the re-ranked list.

After the filtering, a ranked list of recommended items can be generated at operation 695. In some embodiments, each of the ranked list of recommended items has a corresponding re-ranking score and is recommended to be displayed at a corresponding position in a webpage based on its corresponding re-ranking score. In some examples, the item recommendation computing device 102 may transmit the ranked list of recommended items to the web server 104 in response to the recommendation request.

Figure 7:
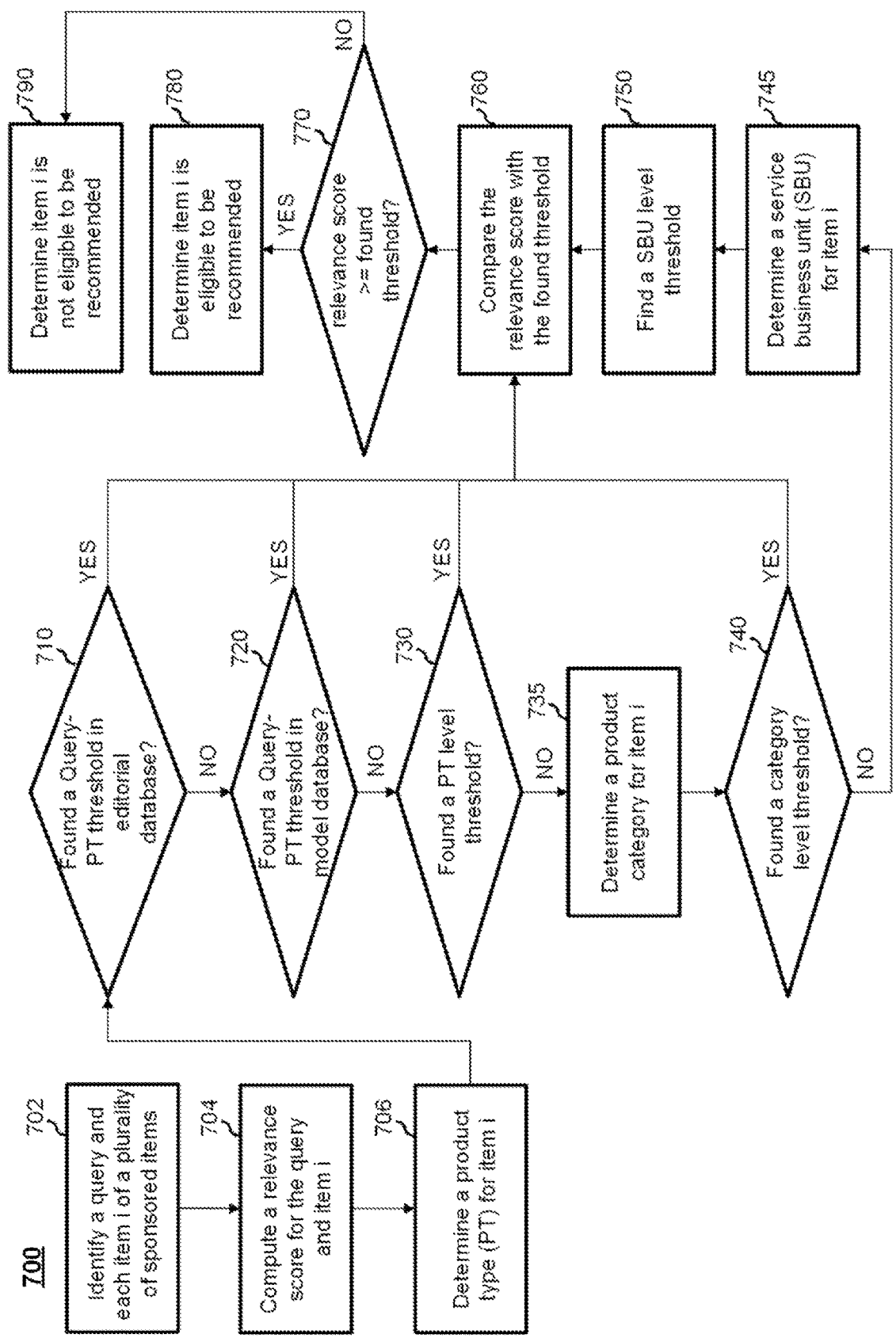
FIG. 7 illustrates a process for classifying sponsored items based on their relevancy to a query, in accordance with some embodiments of the present teaching.

FIG. 7 illustrates a process 700 for classifying sponsored items based on their relevancy to a query, in accordance with some embodiments of the present teaching. In some embodiments, the process 700 may be carried out by one or more computing devices, such as the item recommendation computing device 102 and/or the cloud-based engine 121 of FIG. 1. In some embodiments, the process 700 may be performed as part of the operations 641, 642, 643 and/or 680 in FIG. 6.

As shown in FIG. 7, the process 700 starts from operation 702, where the item recommendation computing device 102 may identify a query and each item i of a plurality of sponsored items, e.g. in response to a search request or recommendation request from the web server 104. At operation 704, a relevance score is computed for the query and item i, to represent a degree of relevancy between the query and item i. In some embodiments, the relevance score may be generated by applying at least one trained machine learning model (e.g. the relevance model 394) to the sponsored item i and the query. In some embodiments, the relevance model 394 may be trained based on historical user session data, historical user transaction data, historical search data, and/or historical advertisement data.

Figure 10:
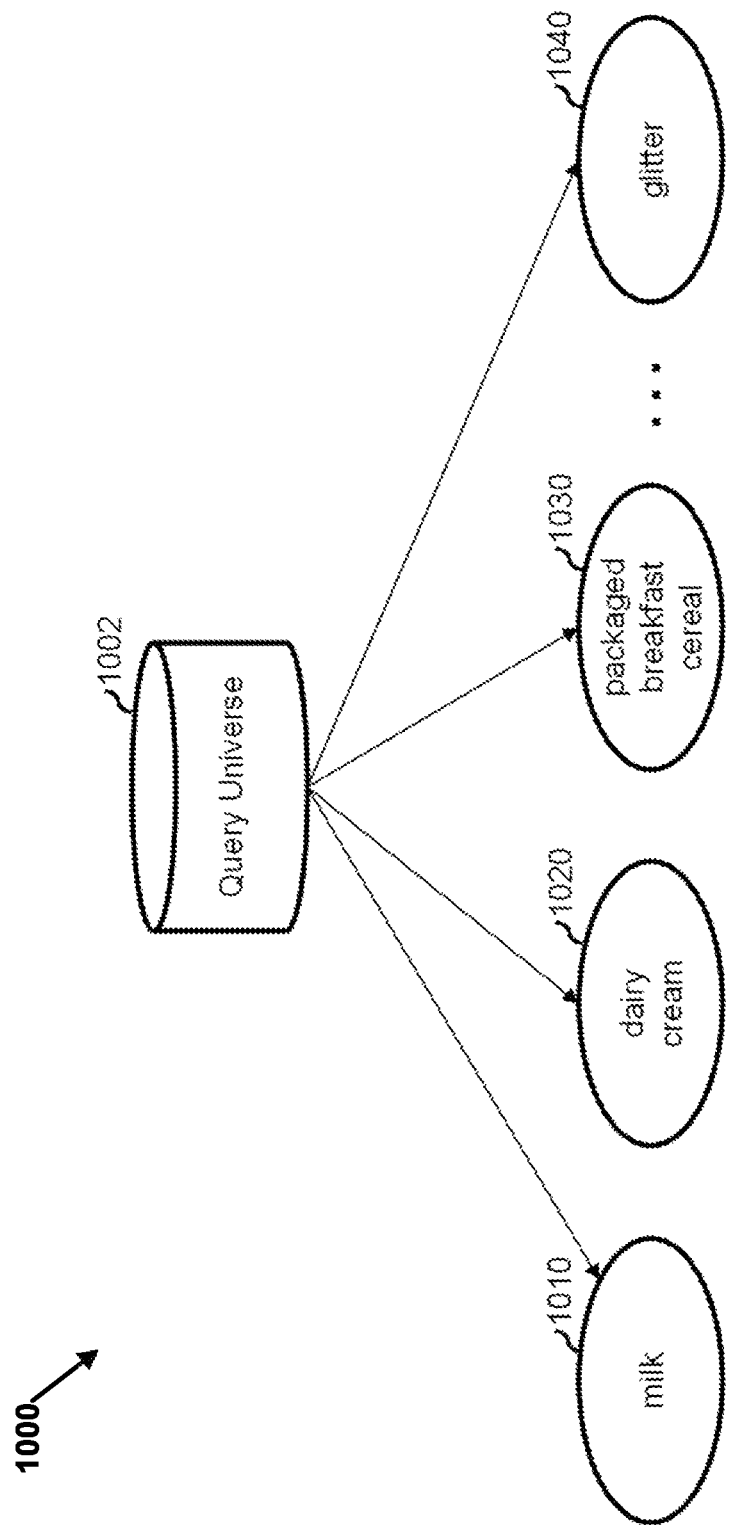
FIG. 10 illustrates exemplary product types for filtering sponsored items, in accordance with some embodiments of the present teaching.

As operation 706, a product type (PT) is determined for item i. In some embodiments, all products offered by a retailer's website may be clustered into different product types. The product types may be used for machine learning, data analysis, relevancy control, and/or recommendation ranking. FIG. 10 illustrates exemplary product types for filtering sponsored items, in accordance with some embodiments of the present teaching. As shown in FIG. 10, different queries in a query universe 1002 may be relevant to various product types, like milk 1010, dairy cream 1020, packaged breakfast cereal 1030, glitter 1040, etc.

Referring back to FIG. 7, after the PT is determined for item i, it is determined at operation 710 whether a first query-PT threshold specific to the query and the PT is found in an editorial database, which may be part of the database 116 or a standalone database. In some embodiments, the first query-PT threshold, like other thresholds in the editorial database, is pre-determined based on human generated labels associated with the query and the PT.

If the first query-PT threshold is found at the operation 710, the process goes to operation 760 to compare the relevance score with the found first query-PT threshold. If the first query-PT threshold is not found at the operation 710, the process goes to operation 720.

It is determined at operation 720 whether a second query-PT threshold specific to the query and the PT is found in a model database, which may be part of the database 116 or a standalone database. In some embodiments, the second query-PT threshold, like other thresholds in the model database, is pre-determined based on a machine learning model and historical user engagement data associated with the query and the PT. In some embodiments, the model database includes much more query-PT thresholds than the editorial database. As such, it is more likely to find a query-PT threshold for a given <query, PT> pair in the model database than in the editorial database.

In some embodiments, at least one of the first query-PT threshold and the second query-PT threshold is determined based on some statistical analysis, e.g. based on the following equation (3):

$$t^{m\%}_{<q="storage", p="basket">} = Q^{m\%}_i\left(\min_j(r_{i,j,q,p})\right) \quad (3)$$

where r represents the relevance score; q represents query; p represents the PT, i represents a search event index; and j represents an item number within a single search event.

In some embodiments, to determine a query-PT threshold, the system can combine minimum retrieval or relevance scores from the above equation (3) for the same <query, PT> pair. For example, for <query="coffee", PT="Ground Coffee">: [min=0.2, min=0.5, . . . ]. Then, the system can compute percentiles for each list at 10%, 20%, 30%, etc., e.g. percentiles ([min=0.2, min=0.5, . . . ]). Each percentile or quantile can be used as a threshold for the corresponding <query, PT>. In general, a lower percentile or threshold may mean better recall and poorer precision; while a higher percentile or threshold may mean poorer recall and better precision.

If the second query-PT threshold is found at the operation 720, the process goes to operation 760 to compare the relevance score with the found second query-PT threshold. If the second query-PT threshold is not found at the operation 720, the process goes to operation 730.

It is determined at operation 730 whether a PT level threshold specific to the PT is found in a PT level threshold database, which may be part of the database 116 or a standalone database. In some embodiments, the PT level threshold, like other thresholds in the PT level threshold database, is pre-determined based on a percentile analysis of a distribution of relevance scores of items in the PT.

In some embodiments, the PT level threshold is determined based on some statistical analysis, e.g. based on the following equation (4):

$$t^{m\%}_{p="basket"} = Q^{m\%}_i\left(\min_j(r_{i,j,p})\right) \quad (4)$$

where r represents the relevance score; p represents the PT, i represents a search event index; and j represents an item number within a single search event.

In some embodiments, to determine the PT level threshold for a PT, in each search event, the system can find all sponsored items in the same PT with position <=N, and take the minimum of their retrieval or relevance scores. N may be a parameter that can vary by segments.

If the PT level threshold is found at the operation 730, the process goes to operation 760 to compare the relevance score with the found PT level threshold. If the PT level threshold is not found at the operation 730, the process goes to operation 735.

At operation 735, a product category is determined for item i. In some embodiments, all products in a retailer's inventory may be clustered into different product categories. The product categories may be used for organizing supply chain, collecting, managing and transporting products in the inventory. In some embodiments, one product category may include multiple product types. In some embodiments, one product type may be assigned to multiple product categories. In some embodiments, the total number of categories is larger than the total number of product types.

After the product category is determined for item i, it is determined at operation 740 whether a category level threshold specific to the product category is found in a category level database, which may be part of the database 116 or a standalone database. In some embodiments, the category level threshold, like other thresholds in the category level database, is pre-determined based on a percentile analysis of a distribution of relevance scores of items in the product category.

If the category level threshold is found at the operation 740, the process goes to operation 760 to compare the relevance score with the found category level threshold. If the category level threshold is not found at the operation 740, the process goes to operation 745.

Figure 9:
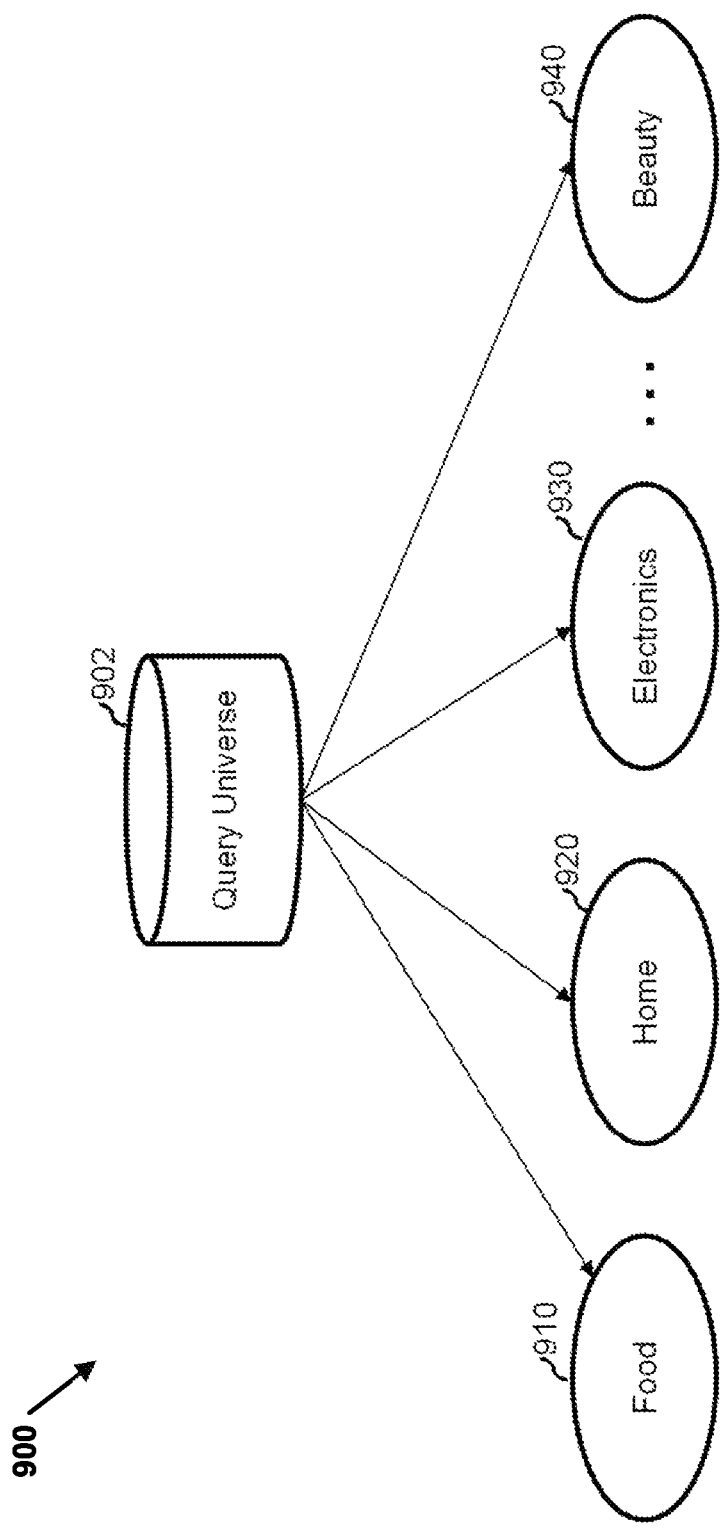
FIG. 9 illustrates exemplary business departments for filtering sponsored items, in accordance with some embodiments of the present teaching.

At operation 745, a service business unit (SBU) is determined for item i. In some embodiments, all products offered by a retailer may be clustered into different business departments. FIG. 9 illustrates exemplary business departments for filtering sponsored items, in accordance with some embodiments of the present teaching. As shown in FIG. 9, different queries in a query universe 902 may be relevant to various business departments, like food 910, home 920, electronics 930, beauty 940, etc. These business departments in FIG. 9 may correspond to different product categories or different SBUs, in different embodiments. In some embodiments, one business department may include multiple product types. For example, the department of food 910 may include product types: milk 1010, dairy cream 1020, packaged breakfast cereal 1030, etc. in FIG. 10. That is, business department is at a higher hierarchy than product type. In some embodiments, SBU can be defined as the highest hierarchy (higher than PT and category) when clustering different products of a retailer. The SBUs may be used for management level report of retailer performances.

In one example, for a query "storage," a PT "basket" is determined. An editorial database may include a threshold in form of csv, for the query-PT pair <storage, basket>. A model database may include a threshold in form of hive table, for the query-PT pair <storage, basket>. A PT level database may include a threshold in form of csv, for the PT "basket." A super department or SBU level database may include a threshold in form of csv, for a department "Home" including the PT "basket."

Referring back to FIG. 7, because there is usually very limited number of SBUs, e.g. less than 10 SBUs, in total for a retailer, it is assumed that there is a SBU level threshold for each SBU. At operation 750, a SBU level threshold specific to the SBU determined at the operation 745, is found in a SBU level database, which may be part of the database 116 or a standalone database. In some embodiments, the SBU level threshold, like other thresholds in the SBU level database, is pre-determined based on a percentile analysis of a distribution of relevance scores of items in the SBU.

At operation 760, the relevance score is compared with the found threshold, which may be the first query-PT threshold from the operation 710, the second query-PT threshold from the operation 720, the PT level threshold from the operation 730, the category level threshold from the operation 740, or the SBU level threshold from the operation 750.

It is determined at operation 770 whether the relevance score for item i with respect to the query is beyond (larger than or equal to) the found threshold. If so, the process goes to operation 780 to determine item i is eligible to be recommended in response to the query. If not, the process goes to operation 790 to determine item i is not eligible to be recommended in response to the query.

Figure 8:
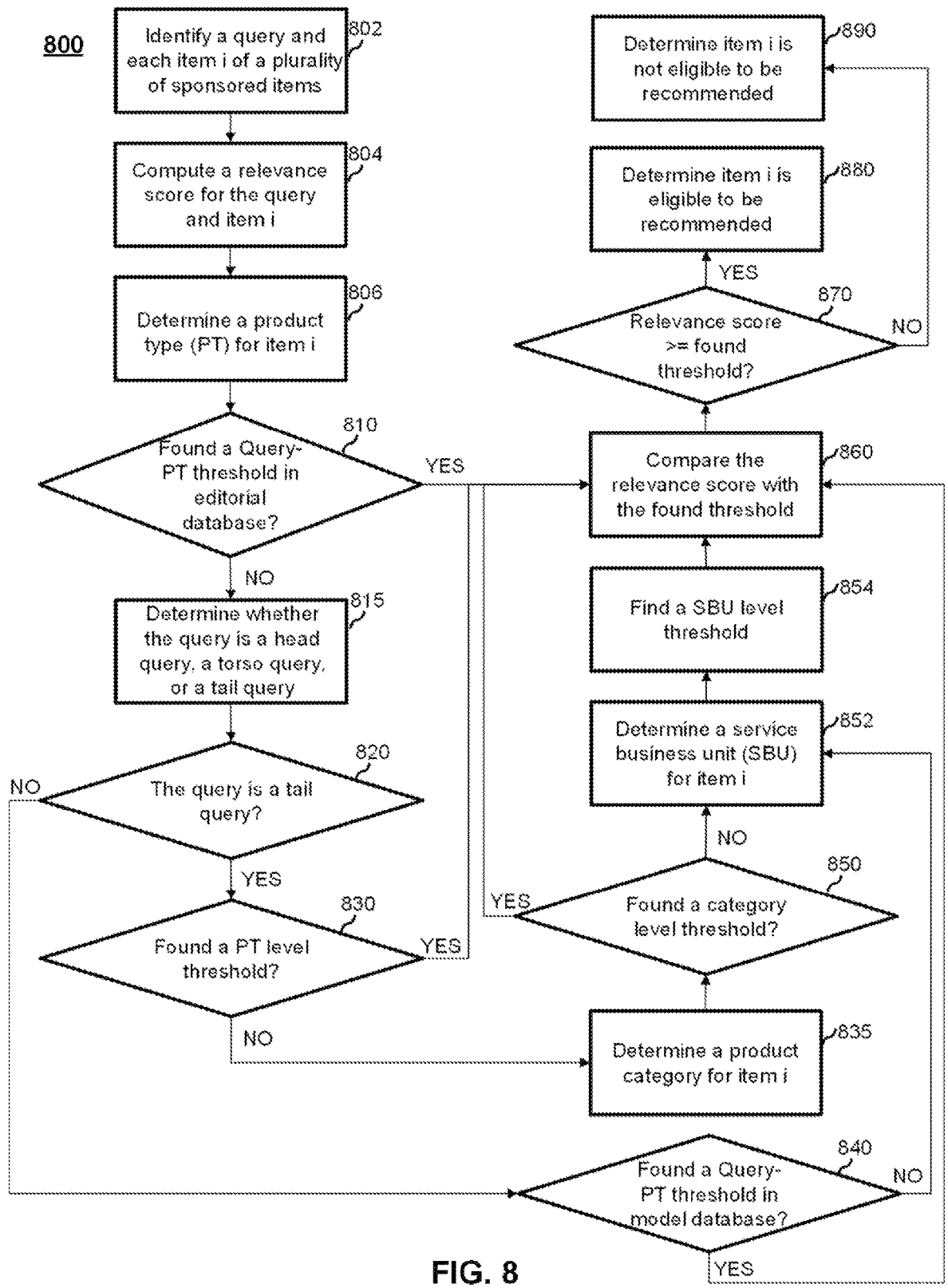
FIG. 8 illustrates another process for classifying sponsored items based on their relevancy to a query, in accordance with some embodiments of the present teaching.

FIG. 8 illustrates another process 800 for classifying sponsored items based on their relevancy to a query, in accordance with some embodiments of the present teaching. In some embodiments, the process 800 may be carried out by one or more computing devices, such as the item recommendation computing device 102 and/or the cloud-based engine 121 of FIG. 1. In some embodiments, the process 800 may be performed as part of the operations 641, 642, 643 and/or 680 in FIG. 6.

In the example shown in FIG. 8, the first three operations 802, 804, 806, 810 in the process 800 are the same as the first three operations 702, 704, 706, 710 in the process 700 in FIG. 7, respectively. At operation 810, if the first query-PT threshold is found, the process goes to operation 860 to compare the relevance score with the found first query-PT threshold. If the first query-PT threshold is not found at the operation 810, the process goes to operation 815, to determine whether the query is a head query, a torso query, or a tail query, e.g. based on historical user session data of users of the website, and historical search traffic data.

In some embodiments, the query is determined to be a head query when a number of clicks collected from the query during a past time period is beyond a first percentile. The query may be determined to be a tail query when the number of clicks collected from the query during the past time period is below a second percentile that is lower than the first percentile. The query may be determined to be a torso query when the number of clicks collected from the query during the past time period is below the first percentile and above the second percentile. In some embodiments, each of the first percentile and the second percentile is determined based on click data of different queries submitted to the website during the past time period. In some examples, the past time period may be the past day, past week, past month, past quarter, or past year. In some examples, the first percentile may be $90^{th}$, $80^{th}$, $70^{th}$, or $67^{th}$ percentile; the second percentile may be $40^{th}$, $33^{rd}$ or $30^{th}$ percentile. Since the historical search traffic data may be updated every month, the query type for a same query may change after the search traffic data is updated.

It is determined at operation 820 whether the query is a tail query. If so, the process goes to operation 830. If not, the process goes to operation 840.

When the first query-PT threshold is not found in the editorial database and when the query is a tail query, it is determined at operation 830 whether a PT level threshold specific to the PT is found in a PT level threshold database, which may be part of the database 116 or a standalone database. In some embodiments, the PT level threshold, like other thresholds in the PT level threshold database, is pre-determined based on a percentile analysis of a distribution of relevance scores of items in the PT. If the PT level threshold is found at the operation 830, the process goes to operation 860 to compare the relevance score with the found PT level threshold. If the PT level threshold is not found at the operation 830, the process goes to operation 835.

Then, the operations 835, 850, 852, 854 can be performed similarly to the operations 735, 740, 745, 750 in the process 700 in FIG. 7, respectively, except that the operations 835, 850, 852, 854 are performed only when the query is a tail query.

When the first query-PT threshold is not found in the editorial database and when the query is not a tail query (i.e. when the query is a head query or a torso query), it is determined at operation 840 whether a second query-PT threshold specific to the query and the PT is found in a model database, which may be part of the database 116 or a standalone database. In some embodiments, the second query-PT threshold, like other thresholds in the model database, is pre-determined based on a machine learning model and historical user engagement data associated with the query and the PT.

If the second query-PT threshold is found at the operation 840, the process goes to operation 860 to compare the relevance score with the found second query-PT threshold. If the second query-PT threshold is not found at the operation 840, the process goes to operation 852, to seek a SBU level threshold. In some embodiments, if the query is a head or torso query (not tail query), and if no query-PT level threshold is found in either editorial or model database, the process 800 may stop, which means no filtering is performed on the plurality of sponsored items based on relevancy to the query.

At operation 860, the relevance score is compared with the found threshold, which may be the first query-PT threshold from the operation 810, the second query-PT threshold from the operation 840, the PT level threshold from the operation 830, the category level threshold from the operation 850, or the SBU level threshold from the operation 854. Then, the operations 870, 880, 890 can be performed similarly to the operations 770, 780, 790 in the process 700 in FIG. 7, respectively, to determine item i is eligible or ineligible to be recommended in response to the query.

In some embodiments, while the process 700 and the process 800 can be performed online in real-time (e.g. within one second) once a query is submitted, the thresholds (including the first query-PT threshold, the second query-PT threshold, the PT level threshold, the category level threshold, and the SBU level threshold) may be pre-determined offline. In some embodiments, at least one of these thresholds can be determined and evaluated based on an F1 score computed based on a harmonic mean of a precision value and a recall value. In some examples, the precision value represents a relevancy of recommended sponsored items to the query, and the recall value represents an advertisement filling rate of sponsored items in the webpage. An advertisement filling rate may be determined based on a number of sponsored items in the search results for a query, and a number of total items in the search results. In some embodiments, the relevance scores and the thresholds may be updated regularly, e.g. every month or every two months.

Figure 11:
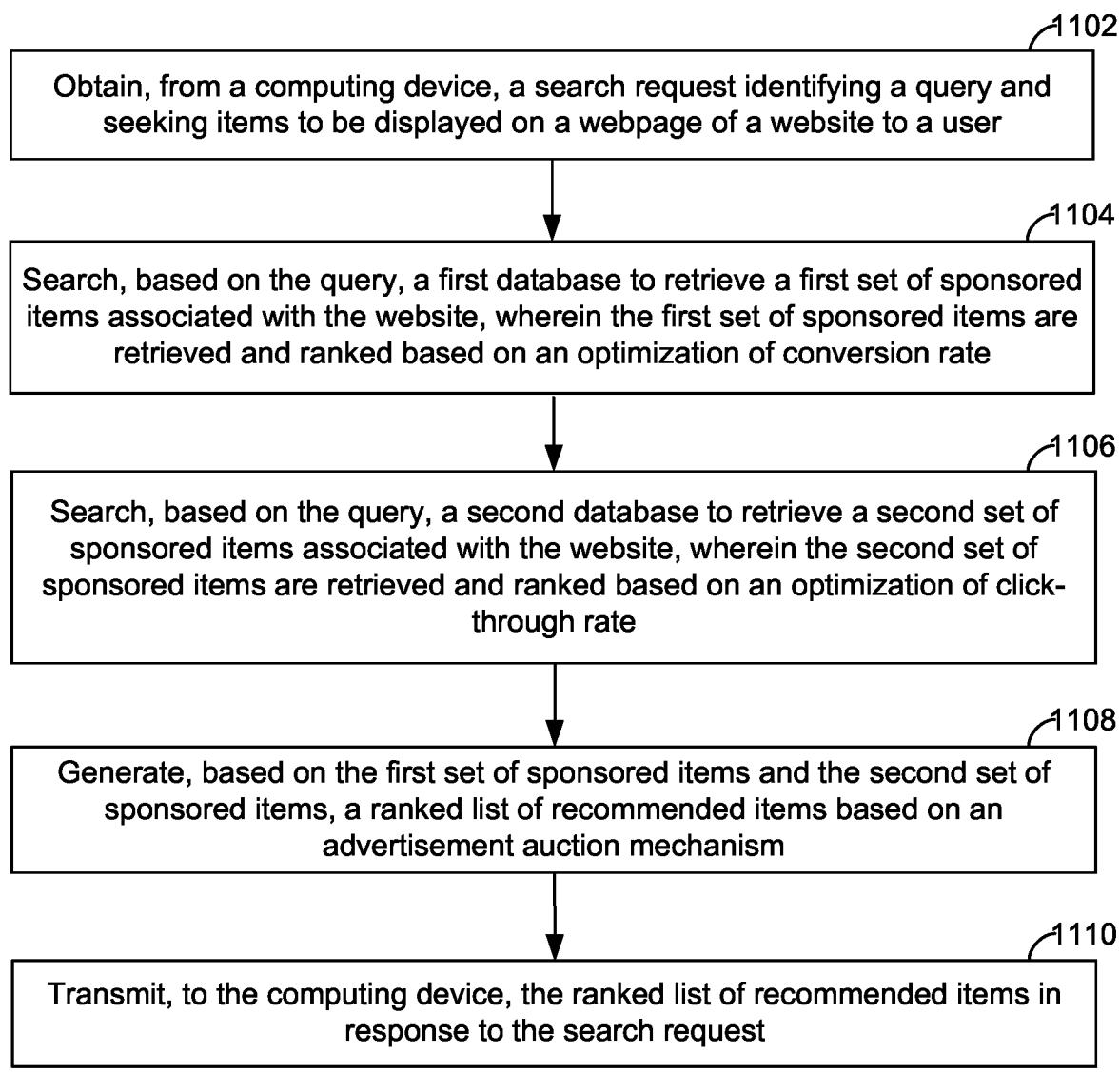
FIG. 11 is a flowchart illustrating an exemplary method for generating a ranked list of recommended items in response to a query, in accordance with some embodiments of the present teaching.

FIG. 11 is a flowchart illustrating an exemplary method 1100 for generating a ranked list of recommended items in response to a query, in accordance with some embodiments of the present teaching. In some embodiments, the method 1100 can be carried out by one or more computing devices, such as the item recommendation computing device 102 and/or the cloud-based engine 121 of FIG. 1. Beginning at operation 1102, a search request is obtained from a computing device, to identify a query and seek items to be displayed on a webpage of a website to a user. At operation 1104, a first database is searched based on the query to retrieve a first set of sponsored items associated with the website. The first set of sponsored items are retrieved and ranked based on an optimization of conversion rate. At operation 1106, a second database is searched based on the query to retrieve a second set of sponsored items associated with the website. The second set of sponsored items are retrieved and ranked based on an optimization of click-through rate. Based on the first set of sponsored items and the second set of sponsored items, a ranked list of recommended items is generated at operation 1108 based on an advertisement auction mechanism. At operation 1110, the ranked list of recommended items is transmitted to the computing device in response to the search request.

Figure 12:
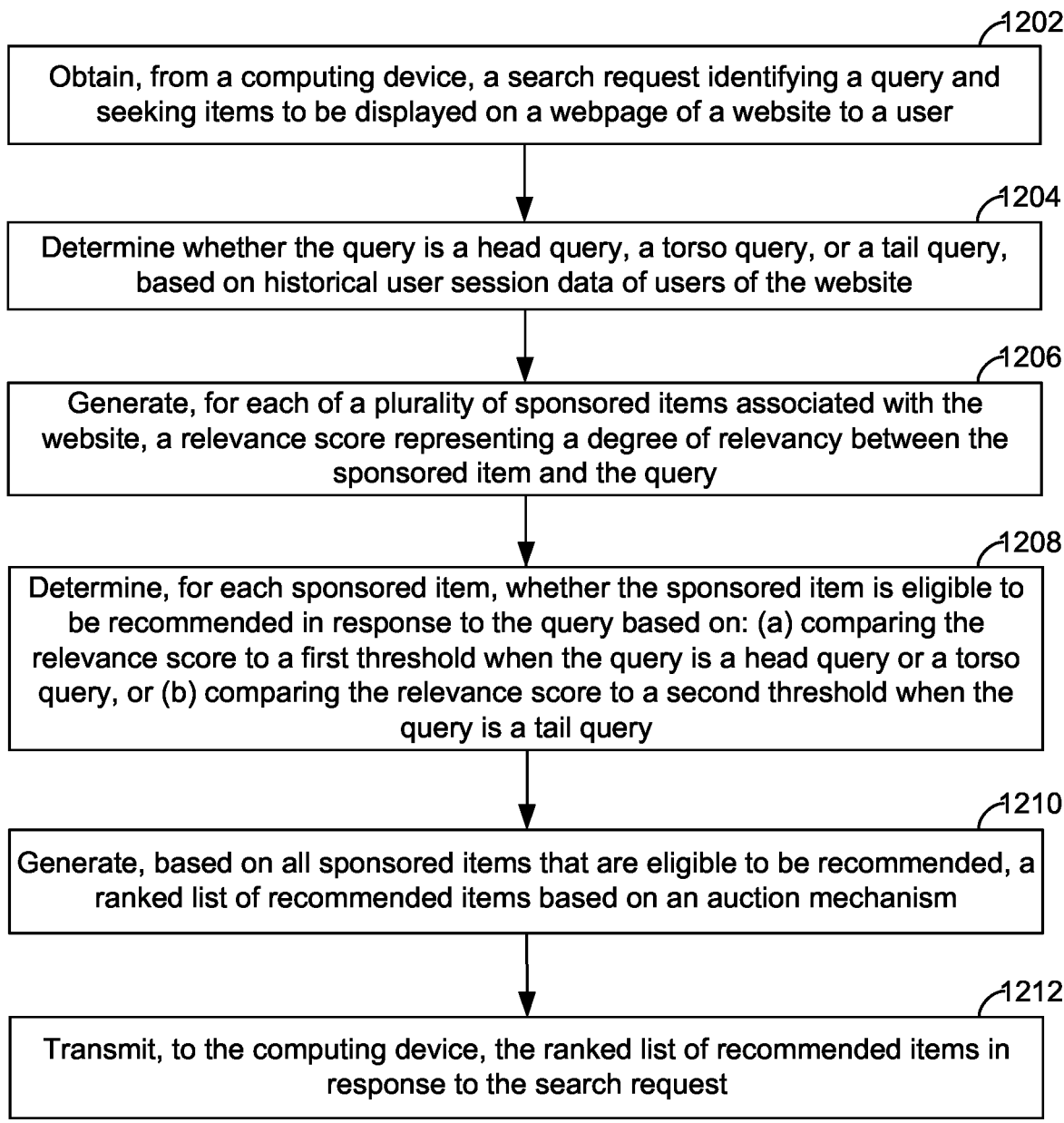
FIG. 12 is a flowchart illustrating an exemplary method for filtering sponsored items based on their relevancy to a query, in accordance with some embodiments of the present teaching.

FIG. 12 is a flowchart illustrating an exemplary method 1200 for filtering sponsored items based on their relevancy to a query, in accordance with some embodiments of the present teaching. In some embodiments, the method 1200 can be carried out by one or more computing devices, such as the item recommendation computing device 102 and/or the cloud-based engine 121 of FIG. 1. Beginning at operation 1202, a search request is obtained from a computing device, to identify a query and seek items to be displayed on a webpage of a website to a user. At operation 1204, it is determined whether the query is a head query, a torso query, or a tail query, based on historical user session data of users of the website. At operation 1206, a relevance score is generated, for each of a plurality of sponsored items associated with the website, to represent a degree of relevancy between the sponsored item and the query.

For each sponsored item, it is determined at operation 1208 whether the sponsored item is eligible to be recommended in response to the query based on: (a) comparing the relevance score to a first threshold when the query is a head query or a torso query, or (b) comparing the relevance score to a second threshold when the query is a tail query. From all sponsored items that are eligible to be recommended, a ranked list of recommended items is generated at operation 1210 based on an advertisement auction mechanism. At operation 1212, the ranked list of recommended items is transmitted to the computing device in response to the search request.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMS, ROMS, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
a non-transitory memory having instructions stored thereon; and
at least one processor operatively coupled to the non-transitory memory, and configured to read the instructions to:
obtain, from a computing device, a search request identifying a query and seeking items to be displayed on a webpage of a website to a user,
search, based on the query, a first database to retrieve a first set of sponsored items associated with the website, wherein the first set of sponsored items are retrieved and ranked based on an optimization of conversion rate,
search, based on the query, a second database to retrieve a second set of sponsored items associated with the website, wherein the second set of sponsored items are retrieved and ranked based on an optimization of click-through rate,
compute, for each sponsored item in the first set and the second set, a relevance score representing a degree of relevancy between the sponsored item and the query,
filter the first set of sponsored items based on their relevance scores and at least one predetermined threshold, to generate a first filtered set of sponsored items,
generate, for each of the first filtered set of sponsored items, a first ranking score representing a likelihood of conversion using a first machine learning model,
select, from the first filtered set, up to a predetermined first number of sponsored items based on their respective first ranking scores, to generate a first selected set of sponsored items,
filter the second set of sponsored items based on their relevance scores and at least one predetermined threshold, to generate a second filtered set of sponsored items,
generate, for each of the second filtered set of sponsored items, a second ranking score representing a likelihood of click using a second machine learning model,
select, from the second filtered set, up to a predetermined second number of sponsored items based on their respective second ranking scores, to generate a second selected set of sponsored items,
generate, based on the first selected set of sponsored items and the second selected set of sponsored items, a ranked list of recommended items based on an advertisement auction mechanism, and
transmit, to the computing device, the ranked list of recommended items in response to the search request.

2. The system of claim 1, wherein the second database is searched based on a determination that the query is not associated with an explicit intent or an implicit intent of the user.

3. The system of claim 1, wherein the at least one processor is further configured to read the instructions to:
search, based on the query, the second database to retrieve a third set of sponsored items associated with the website, wherein the third set of sponsored items are retrieved and ranked based on an optimization of click-through rate.

4. The system of claim 3, wherein:
each of the second set of sponsored items is retrieved based on a literal match to the query; and
each of the third set of sponsored items is retrieved based on a semantic match to the query.

5. The system of claim 3, wherein the at least one processor is further configured to read the instructions to:
filter the third set of sponsored items based on their relevance scores and at least one predetermined threshold, to generate a third filtered set of sponsored items;
generate, for each of the third filtered set of sponsored items, a third ranking score representing a likelihood of click using a third machine learning model; and
select, from the third filtered set, up to a predetermined third number of sponsored items based on their respective second ranking scores, to generate a third selected set of sponsored items.

6. The system of claim 1, wherein:
the click-through rate is computed by the computing device based on a ratio between a number of clicks of users on an item and a number of times the item is displayed to the users;
the first machine learning model is assigned to be executed on a first processing device to generate the first ranking score; and
the second machine learning model is assigned to be executed on a second processing device to generate the second ranking score.

7. The system of claim 5, wherein the at least one processor is further configured to read the instructions to:
merge the three selected sets of sponsored items to generate a unified list of sponsored items; and
compute, for each of the unified list of sponsored items, a unified ranking score based on a weighted average of the first ranking score and a maximum of the second ranking score and the third ranking score.

8. The system of claim 7, wherein the at least one processor is further configured to read the instructions to:
compare the unified ranking score of each sponsored item in the unified list with a dynamic threshold, wherein the dynamic threshold is determined based on a machine learning model and a traffic segment of the query; and
select sponsored items beyond the dynamic threshold from the unified list to generate a relevant list of sponsored items.

9. The system of claim 8, wherein the at least one processor is further configured to read the instructions to:
obtain, based on the advertisement auction mechanism, cost per click (CPC) data associated with each of the relevant list of sponsored items; and
modify, based on the CPC data and a predetermined price squashing parameter, the unified ranking score to generate a re-ranking score for each sponsored item in the relevant list.

10. The system of claim 9, wherein the at least one processor is further configured to read the instructions to:
re-rank the relevant list of sponsored items based on their respective re-ranking scores; and
filter, based on item availability in local inventory for the user, the re-ranked sponsored items to generate the ranked list of recommended items, wherein each of the ranked list of recommended items has a corresponding re-ranking score and is recommended to be displayed at a corresponding position in the webpage based on its corresponding re-ranking score.

11. A computer-implemented method, comprising:
obtaining, from a computing device, a search request identifying a query and seeking items to be displayed on a webpage of a website to a user;
searching, based on the query, a first database to retrieve a first set of sponsored items associated with the website, wherein the first set of sponsored items are retrieved and ranked based on an optimization of conversion rate;
searching, based on the query, a second database to retrieve a second set of sponsored items associated with the website, wherein the second set of sponsored items are retrieved and ranked based on an optimization of click-through rate;
computing, for each sponsored item in the first set and the second set, a relevance score representing a degree of relevancy between the sponsored item and the query;
filtering the first set of sponsored items based on their relevance scores and at least one predetermined threshold, to generate a first filtered set of sponsored items;
generating, for each of the first filtered set of sponsored items, a first ranking score representing a likelihood of conversion using a first machine learning model;
selecting, from the first filtered set, up to a predetermined first number of sponsored items based on their respective first ranking scores, to generate a first selected set of sponsored items;
filtering the second set of sponsored items based on their relevance scores and at least one predetermined threshold, to generate a second filtered set of sponsored items;
generating, for each of the second filtered set of sponsored items, a second ranking score representing a likelihood of click using a second machine learning model;
selecting, from the second filtered set, up to a predetermined second number of sponsored items based on their respective second ranking scores, to generate a second selected set of sponsored items;
generating, based on the first selected set of sponsored items and the second selected set of sponsored items, a ranked list of recommended items based on an advertisement auction mechanism; and
transmitting, to the computing device, the ranked list of recommended items in response to the search request.

12. The computer-implemented method of claim 11, further comprising:
searching, based on the query, the second database to retrieve a third set of sponsored items associated with the website, wherein the third set of sponsored items are retrieved and ranked based on an optimization of click-through rate, wherein
each of the second set of sponsored items is retrieved based on a literal match to the query; and
each of the third set of sponsored items is retrieved based on a semantic match to the query.

13. The computer-implemented method of claim 12, further comprising:
filtering the third set of sponsored items based on their relevance scores and at least one predetermined threshold, to generate a third filtered set of sponsored items;
generating, for each of the third filtered set of sponsored items, a third ranking score representing a likelihood of click using a third machine learning model; and
selecting, from the third filtered set, up to a predetermined third number of sponsored items based on their respective second ranking scores, to generate a third selected set of sponsored items.

14. The computer-implemented method of claim 11, wherein:
the click-through rate is computed by the computing device based on a ratio between a number of clicks of users on an item and a number of times the item is displayed to the users;
the first machine learning model is assigned to be executed on a first processing device to generate the first ranking score; and
the second machine learning model is assigned to be executed on a second processing device to generate the second ranking score.

15. The computer-implemented method of claim 11, further comprising:
merging the three selected sets of sponsored items to generate a unified list of sponsored items; and
computing, for each of the unified list of sponsored items, a unified ranking score based on a weighted average of the first ranking score and a maximum of the second ranking score and the third ranking score.

16. The computer-implemented method of claim 15, further comprising:
comparing the unified ranking score of each sponsored item in the unified list with a dynamic threshold, wherein the dynamic threshold is determined based on a machine learning model and a traffic segment of the query; and
selecting sponsored items beyond the dynamic threshold from the unified list to generate a relevant list of sponsored items.

17. The computer-implemented method of claim 16, further comprising:
obtaining, based on the advertisement auction mechanism, cost per click (CPC) data associated with each of the relevant list of sponsored items; and modifying, based on the CPC data and a predetermined price squashing parameter, the unified ranking score to generate a re-ranking score for each sponsored item in the relevant list.

18. The computer-implemented method of claim 17, further comprising:
re-ranking the relevant list of sponsored items based on their respective re-ranking scores; and
filtering, based on item availability in local inventory for the user, the re-ranked sponsored items to generate the ranked list of recommended items, wherein each of the ranked list of recommended items has a corresponding re-ranking score and is recommended to be displayed at a corresponding position in the webpage based on its corresponding re-ranking score.

19. A non-transitory computer readable medium having instructions stored thereon, wherein the instructions, when executed by at least one processor, cause at least one device to perform operations comprising:
obtaining, from a computing device, a search request identifying a query and seeking items to be displayed on a webpage of a website to a user;
searching, based on the query, a first database to retrieve a first set of sponsored items associated with the website, wherein the first set of sponsored items are retrieved and ranked based on an optimization of conversion rate;
searching, based on the query, a second database to retrieve a second set of sponsored items associated with the website, wherein the second set of sponsored items are retrieved and ranked based on an optimization of click-through rate;
computing, for each sponsored item in the first set and the second set, a relevance score representing a degree of relevancy between the sponsored item and the query;
filtering the first set of sponsored items based on their relevance scores and at least one predetermined threshold, to generate a first filtered set of sponsored items;
generating, for each of the first filtered set of sponsored items, a first ranking score representing a likelihood of conversion using a first machine learning model;
selecting, from the first filtered set, up to a predetermined first number of sponsored items based on their respective first ranking scores, to generate a first selected set of sponsored items;
filtering the second set of sponsored items based on their relevance scores and at least one predetermined threshold, to generate a second filtered set of sponsored items;
generating, for each of the second filtered set of sponsored items, a second ranking score representing a likelihood of click using a second machine learning model;
selecting, from the second filtered set, up to a predetermined second number of sponsored items based on their respective second ranking scores, to generate a second selected set of sponsored items;
generating, based on the first selected set of sponsored items and the second selected set of sponsored items, a ranked list of recommended items based on an advertisement auction mechanism; and
transmitting, to the computing device, the ranked list of recommended items in response to the search request.

20. The non-transitory computer readable medium of claim 19, wherein the second database is searched based on a determination that the query is not associated with an explicit intent or an implicit intent of the user.

* * * * *